(12) United States Patent
Lee et al.

(10) Patent No.: US 11,538,479 B2
(45) Date of Patent: Dec. 27, 2022

(54) DIGITAL MICROPHONE INTERFACE CIRCUIT FOR VOICE RECOGNITION AND INCLUDING THE SAME

(71) Applicant: Samsung Electronics Co., Ltd., Suwon-si (KR)

(72) Inventors: Sung-No Lee, Hwaseong-si (KR); Hyochul Shin, Seoul (KR); Hyungdong Roh, Yongin-si (KR); Yong Ki Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 17/130,401

(22) Filed: Dec. 22, 2020

(65) Prior Publication Data
US 2021/0304751 A1    Sep. 30, 2021

(30) Foreign Application Priority Data
Mar. 30, 2020    (KR) .......................... 10-2020-0038326

(51) Int. Cl.
*G10L 15/22*    (2006.01)
*H04R 3/00*    (2006.01)
(Continued)

(52) U.S. Cl.
CPC .............. *G10L 15/22* (2013.01); *G10L 15/10* (2013.01); *G10L 15/28* (2013.01); *H04R 3/00* (2013.01)

(58) Field of Classification Search
CPC ......... G10L 15/10; G10L 15/22; G10L 15/28; H04R 3/00; H04R 3/005
(Continued)

(56) References Cited

U.S. PATENT DOCUMENTS 5,483,238 A  *  1/1996  Norsworthy ............ H03M 3/51
                                                   341/131
5,724,433 A  *  3/1998  Engebretson .......... H04R 25/70
                                                   381/108
(Continued)

FOREIGN PATENT DOCUMENTS

JP    3594356 B2    11/2004
JP    4531350 B2     8/2010
(Continued)

OTHER PUBLICATIONS

Hodgetts et al., "Did You Know How Loud Balloons Can Be," Canadian Audiologist, vol. 3, Issue 6, 2016.

*Primary Examiner* — Antim G Shah
(74) *Attorney, Agent, or Firm* — Muir Patent Law, PLLC

(57) ABSTRACT

Disclosed is an electronic device which includes an audio processing block for voice recognition in a low-power mode. The electronic device includes a digital microphone that receives a voice signal from a user and converts the received voice signal into a PDM signal, and a DMIC interface circuit. The DMIC interface circuit includes a PDM-PCM converting block that converts the PDM signal into a PCM signal, a maxscale gain tuning block that tunes a maxscale gain of the PCM signal received from the PDM-PCM converting block based on a distance information indicating a physical distance between the user and the electronic device acquired in advance of the converting of the PDM signal, and an anti-aliasing block that performs filtering for acquiring voice data of a target frequency band associated with a PCM signal output from the maxscale gain tuning block.

17 Claims, 14 Drawing Sheets

(51) Int. Cl.
*G10L 15/10* (2006.01)
*G10L 15/28* (2013.01)

(58) Field of Classification Search
USPC .......................................................... 704/270
See application file for complete search history.

(56) References Cited

U.S. PATENT DOCUMENTS

| | | | |
|---|---|---|---|
| 9,076,447 B2 * | 7/2015 | Nandy | G10L 25/84 |
| 9,214,163 B2 | 12/2015 | Kim | |
| 9,478,234 B1 * | 10/2016 | Nandy | G10L 25/48 |
| 9,502,028 B2 * | 11/2016 | Nandy | G10L 19/002 |
| 9,711,144 B2 * | 7/2017 | Nandy | G10L 25/48 |
| 10,157,629 B2 * | 12/2018 | van der Made | G06N 3/10 |
| 10,244,271 B2 * | 3/2019 | Hayakawa | H04N 21/4223 |
| 2008/0304670 A1 * | 12/2008 | Breebaart | H04S 7/30 |
| | | | 381/17 |
| 2010/0158137 A1 * | 6/2010 | Son | H04B 1/1027 |
| | | | 375/345 |
| 2014/0236582 A1 * | 8/2014 | Raychowdhury | G06F 17/142 |
| | | | 704/205 |
| 2015/0112673 A1 * | 4/2015 | Nandy | G10L 25/84 |
| | | | 704/231 |
| 2015/0112689 A1 * | 4/2015 | Nandy | G10L 15/20 |
| | | | 704/270 |
| 2017/0061963 A1 * | 3/2017 | Nandy | G10L 15/30 |
| 2017/0229117 A1 * | 8/2017 | van der Made | G06F 3/167 |
| 2018/0315416 A1 * | 11/2018 | Berthelsen | G10L 15/005 |
| 2019/0043499 A1 * | 2/2019 | Chang | G10L 15/28 |
| 2021/0304751 A1 * | 9/2021 | Lee | G10L 15/10 |

FOREIGN PATENT DOCUMENTS

| | | |
|---|---|---|
| JP | 4999267 B2 | 8/2012 |
| KR | 10-1148771 B1 | 5/2012 |
| KR | 10-2016-0049347 A | 5/2016 |
| KR | 10-1957170 B1 | 3/2019 |
| KR | 10-2019-0108967 A | 9/2019 |

* cited by examiner

DIGITAL MICROPHONE INTERFACE CIRCUIT FOR VOICE RECOGNITION AND INCLUDING THE SAME

CROSS-REFERENCE TO RELATED APPLICATIONS

This application claims priority under 35 U.S.C. § 119 to Korean Patent Application No. 10-2020-0038326 filed on Mar. 30, 2020, in the Korean Intellectual Property Office, the disclosure of which is incorporated by reference herein in its entirety.

BACKGROUND

Embodiments of the inventive concept described herein relate to an electronic device, and more particularly, relate to an electronic device including a digital microphone interface circuit for voice recognition in a low-power mode.

As artificial intelligence-related technologies develop, nowadays, there is a trend in which an artificial intelligence function is mounted in an electronic device such as a smartphone. For example, the artificial intelligence function includes voice recognition using artificial intelligence, image processing using artificial intelligence, etc. Among the above functions, voice recognition may be utilized in various forms, for example, in the form of a command triggering a specific function of an electronic device, a command waking up the electronic device in a sleep state, etc.

In the case where the electronic device is in a normal mode or a high performance mode, voice recognition is performed by using most data of a voice signal; however, in the case where the electronic device is in a low-power mode or a sleep mode, data to be used in the voice recognition are limited due to a power consumption issue. Accordingly, to make a voice recognition rate high, it is important to select voice data of an appropriate sound pressure level.

However, after a voice signal is received from the user through a microphone, a voice signal is distorted upon changing a gain of a voice signal later based on a result of checking a gain of the voice signal, thereby causing a decrease of a voice recognition rate in a low-power mode.

SUMMARY

Embodiments of the inventive concept provide a way to increase a voice recognition rate of an electronic device in a low-power mode.

In detail, embodiments of the inventive concept provide a way to in advance acquire a distance between a user and the electronic device by using various sensors in the electronic device and to tune a maxscale gain of a PCM signal based on the acquired distance.

According to an exemplary embodiment, an electronic device which includes an audio processing block for voice recognition in a low-power mode includes a digital microphone that receives a voice signal from a user and converts the received voice signal into a pulse density modulation (PDM) signal, and a digital microphone (DMIC) interface circuit. The DMIC interface circuit includes a PDM-PCM converting block that converts the PDM signal into a pulse code modulation (PCM) signal, a maxscale gain tuning block that tunes a maxscale gain of the PCM signal received from the PDM-PCM converting block based on a distance information indicating a physical distance between the user and the electronic device acquired in advance of the converting of the PDM signal, and an anti-aliasing block that performs filtering for acquiring voice data of a target frequency band associated with a PCM signal output from the maxscale gain tuning block.

According to an exemplary embodiment, an electronic device which includes an audio processing block for voice recognition in a low-power mode includes a first digital microphone and a second digital microphone configured to receive a voice signal from a user and convert the received voice signal into a first pulse density modulation (PDM) signal and a second PDM signal, respectively, a first digital microphone (DMIC) interface circuit that receives the first PDM signal, converts the first PDM signal into a first pulse code modulation (PCM) signal, and tunes a maxscale gain of the first PCM signal based on a distance information between a user and the electronic device acquired in advance of receiving the first PDM signal, and a second DMIC interface circuit that receives the second PDM signal, converts the second PDM signal into a second PCM signal, and tunes a maxscale gain of the second PCM signal based on additional distance information different from the distance information acquired in advance of the first PDM signal.

According to an exemplary embodiment, a method for voice recognition of an electronic device which includes a digital microphone (DMIC), a DMIC interface circuit, and a sensor includes acquiring, by the sensor, a distance information between a user and the electronic device, subsequently converting, by the digital microphone, a voice from the user into a pulse density modulation (PDM) signal, subsequently converting, by the DMIC interface circuit, the PDM signal into a pulse code modulation (PCM) signal, tuning, by the DMIC interface circuit, a maxscale gain of the converted PCM signal based on the acquired distance information, performing, by the DMIC interface circuit, filtering for acquiring voice data of a target frequency band associated with the tuned PCM signal, and executing, by a voice recognition module, voice recognition based on the filtered PCM signal.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept are described in detail and clearly to such an extent that an ordinary one in the art easily implements the inventive concept.

Components that are described in the detailed description with reference to the terms "unit", "module", "block", "engine," "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
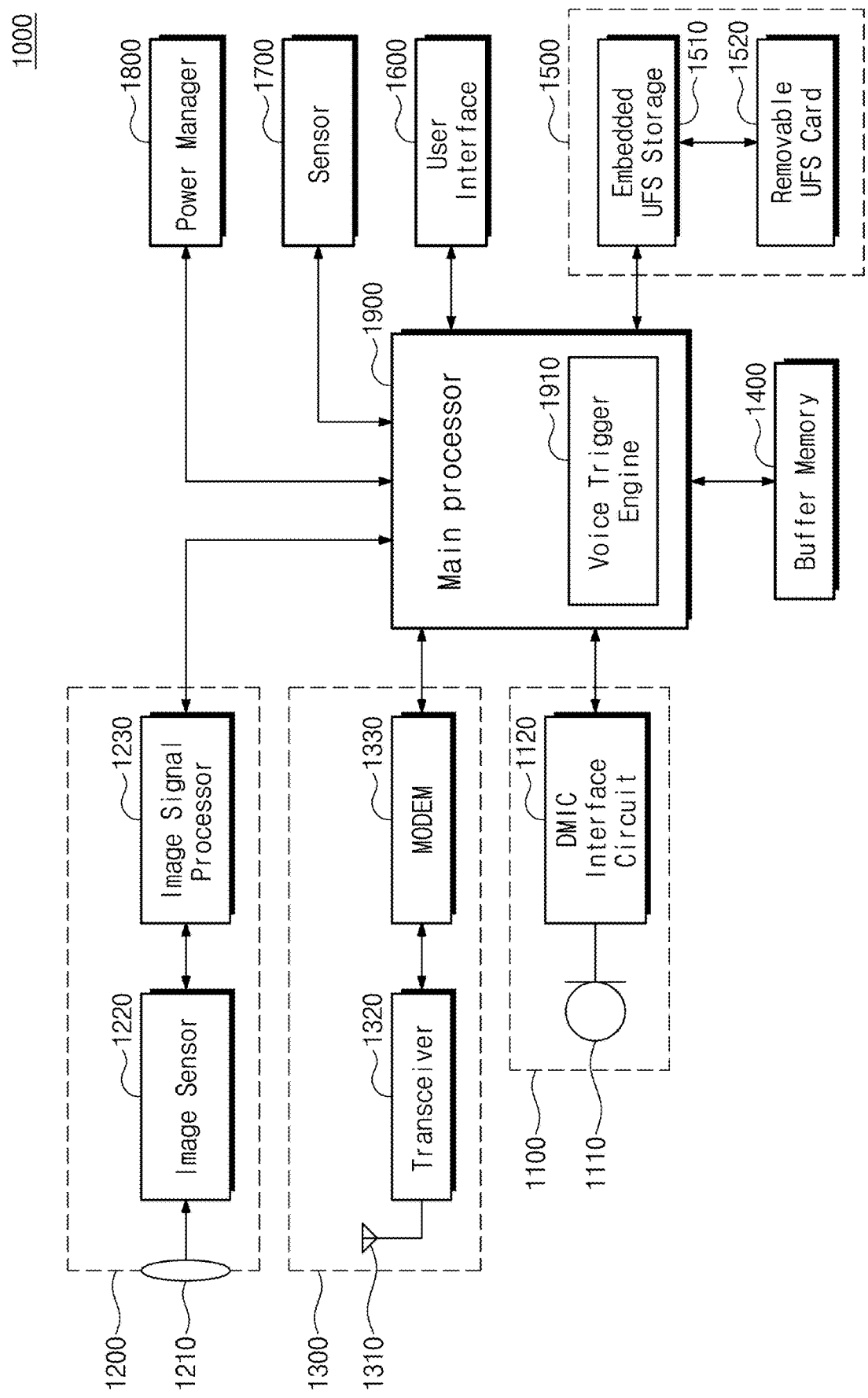
FIG. 1 illustrates an exemplary configuration of an electronic device according to an embodiment of the present disclosure.

FIG. 1 illustrates an exemplary configuration of an electronic device according to an embodiment of the present disclosure.

An electronic device 1000 may include various electronic circuits. For example, the electronic circuits of the electronic device 1000 may include an audio processing block 1100, an image processing block 1200, a communication block 1300, a buffer memory 1400, a nonvolatile memory device 1500, a user interface 1600, a sensor 1700, a power manager 1800, and a main processor 1900. For example, the electronic device 1000 may be implemented with a personal electronic device such as a smartphone, a tablet, or a smart TV, though other electronic devices that implement voice recognition may comprise the electronic device 1000 as well.

The audio processing block 1100 may include a digital microphone 1110 and a digital microphone (DMIC) interface circuit 1120. The audio processing block 1100 may perform processing for voice recognition. For example, the audio processing block 1100 may receive a voice signal through the digital microphone 1110 and may process an output signal of the digital microphone 1110 by using the DMIC interface circuit 1120.

The DMIC interface circuit 1120 may tune a maxscale gain of a pulse code modulation (PCM) signal having a resolution of limited bits, in a low-power mode of the electronic device 1000. For example, tuning the maxscale gain may include determining a maximum signal amplitude, and setting a gain so that the maximum signal amplitude, when processed for example by the DMIC interface circuit 1120, is at a level just below where distortion or failure of voice recognition would occur. The maxscale gain is described in more detail below. However, in some embodiments, to prevent a voice recognition rate from decreasing, the DMIC interface circuit 1120 does not tune the maxscale gain during voice recognition processing. Instead, the DMIC interface circuit 1120 may in advance tune the maxscale gain of the PCM signal based on information about a distance (e.g., physical distance) between the electronic device 1000 and the user, which is in advance acquired by the electronic device 1000. For example, the maxscale gain may be calculated by the main processor 1900 or a separate audio dedicated processor provided in the audio processing block 1100. In some embodiments, a distance value between the electronic device 1000 and the user may be acquired by the image processing block 1200, the sensor 1700, etc.

For example, in the case where a distance between the user and the electronic device 1000 is relatively close, the DMIC interface circuit 1120 may decrease a gain of the PCM signal for the purpose of increasing a short range recognition rate. In contrast, in the case where a distance between the user and the electronic device 1000 is relatively distant, the DMIC interface circuit 1120 may increase a gain of the PCM signal for the purpose of increasing a long range recognition rate. An operation of the DMIC interface circuit 1120 will be described in detail later.

The image processing block 1200 may include a lens 1210, an image sensor 1220, and an image signal processor 1230. The image processing block 1200 may include a device that measures (or acquires) a distance between the user and the electronic device 1000. For example, the image processing block 1200 may be implemented with a time of flight (ToF) camera. In this case, the image sensor 1220 may be referred to as a "depth sensor" or a "TOF sensor". The distance value between the user and the electronic device 1000 acquired by the image processing block 1200 may be stored in the buffer memory 1400, and the DMIC interface circuit 1120 may refer to the distance value stored in the buffer memory 1400 for the purpose of tuning the maxscale gain of the PCM signal. Alternatively, the image processing block 1200 may further include a CMOS image sensor (CIS), a dynamic vision sensor (DVS), etc. The distance may be periodically or continually measured and updated, and/or may be measured and updated in response to a change in distance based on, for example, a motion sensor that detects movement.

An example is illustrated in FIG. 1 in which the image signal processor 1230 is included in the image processing block 1200. However, in another embodiment, the image signal processor 1230 may be provided as a part of the image sensor 1220, may be provided on a component independent of the image processing block 1200, and/or may be provided as a part of the main processor 1900. For example, at least a part of functions that the image signal processor 1230 performs may be performed by the main processor 1900, or at least a part of the functions that the image signal processor 1230 performs may be performed by another image signal processor included in the main processor 1900.

The communication block 1300 may exchange signals with an external device/system through an antenna 1310. A transceiver 1320 and a MODEM (Modulator/Demodulator) 1330 of the communication block 1300 may process the exchanged signals in compliance with various communication protocols. For example, the transceiver 1320 and the MODEM 1330 of the communication block 1300 may process signals, which are exchanged with the external device/system, in compliance with a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID). However, in another embodiment, the communication block 1300 may be provided as a part of the main processor 1900.

The buffer memory 1400 may temporarily store data (e.g., data processed or to be processed by the main processor

1900) that are used for an operation of the electronic device 1000. For example, a voice recognition processing result of the audio processing block 1100 and/or the main processor 1900, and the distance value between the user and the electronic device 1000 acquired by the image processing block 1200 and/or the sensor 1700 may be stored in the buffer memory 1400. For example, the buffer memory 1400 may include a volatile/nonvolatile memory such as a static random access memory (SRAM), a dynamic RAM (DRAM), a synchronous DRAM (SDRAM), a phase-change RAM (PRAM), a magneto-resistive RAM (MRAM), a resistive RAM (ReRAM), or a ferroelectric RAM (FRAM).

The nonvolatile memory device 1500 may store data regardless of whether a power is continuously supplied. For example, the nonvolatile memory device 1500 may include a nonvolatile memory such as a flash memory, a PRAM, an MRAM, a ReRAM, or a FRAM. For example, the nonvolatile memory device 1500 may include a removable memory such as a hard disk drive (HDD), a solid state drive (SSD), a secure digital (SD) card, or a universal flash storage (UFS) card, and/or an embedded memory such as an embedded multimedia card (eMMC). An example is illustrated in FIG. 1 as the nonvolatile memory device 1500 includes embedded UFS 1510 and a removable UFS card 1520 connectable with the main processor 1900 through the embedded UFS 1510. However, in an embodiment, the removable UFS card 1520 may be directly connected with the main processor 1900.

The user interface 1600 may enable communication between the user and the electronic device 1000. For example, the user interface 1600 may include an input interface such as a keypad, a button, a touch screen, a touch pad, a motion sensor, or a gyroscope sensor. For example, the user interface 1600 may further include an output interface such as an organic LED (OLED) display device, an active matrix OLED (AMOLED) display device, a liquid crystal display (LCD) device, light emitting diode (LED) display device, an LED lamp, or a motor.

The sensor 1700 may sense various physical phenomena occurring in the electronic device 1000 or around the electronic device 1000. For example, the sensor 1700 may include a device capable of measuring a distance between the user and the electronic device 1000. For example, the sensor 1700 may include a proximity sensor determining the distance between the user and the electronic device 1000 by using an electric field or an electromagnetic wave (e.g., an infrared light), an ultrasonic sensor determining the distance between the user and the electronic device 1000 by using an ultrasonic wave, etc. Meanwhile, in the case where the image processing block 1200 and the sensor 1700 are implemented to measure a distance between the user and the electronic device 1000, the image processing block 1200 and the sensor 1700 may be for convenience referred to as a "sensor".

A distance value between the user and the electronic device 1000 acquired by the sensor 1700 may be stored in the buffer memory 1400, and the DMIC interface circuit 1120 may refer to the distance value stored in the buffer memory 1400 for the purpose of tuning the maxscale gain of the PCM signal. The sensor 1700 may further include a gyro sensor for measuring an acceleration of the electronic device 1000, a position sensor for measuring a position, etc.

The power manager 1800 may appropriately convert a power received from a battery and/or an external power source. The power manager 1800 may supply the converted power to the components of the electronic device 1000.

The main processor 1900 may perform various operations for the purpose of controlling overall operations of the electronic device 1000. The main processor 1900 may perform the voice recognition based on a signal output from the audio processing block 1100. For example, the main processor 1900 may drive a voice trigger engine 1910 for performing the voice recognition. In an embodiment, the audio processing block 1100 and the voice trigger engine 1910 may be referred to as a "voice recognition module". In some embodiments, the main processor 1900 may be implemented with an application processor, a general-purpose processor, or a special-purpose processor and may include one or more processor cores.

However, the exemplary components illustrated in FIG. 1 are provided for better understanding and are not intended to limit the present disclosure. The electronic device 1000 may not include one or more of the components illustrated in FIG. 1 or may further include at least one component not illustrated in FIG. 1. Further, as discussed above, some functionality of different components of FIG. 1 may be performed by other components, and functionalities of certain components may be combined.

Figure 2:
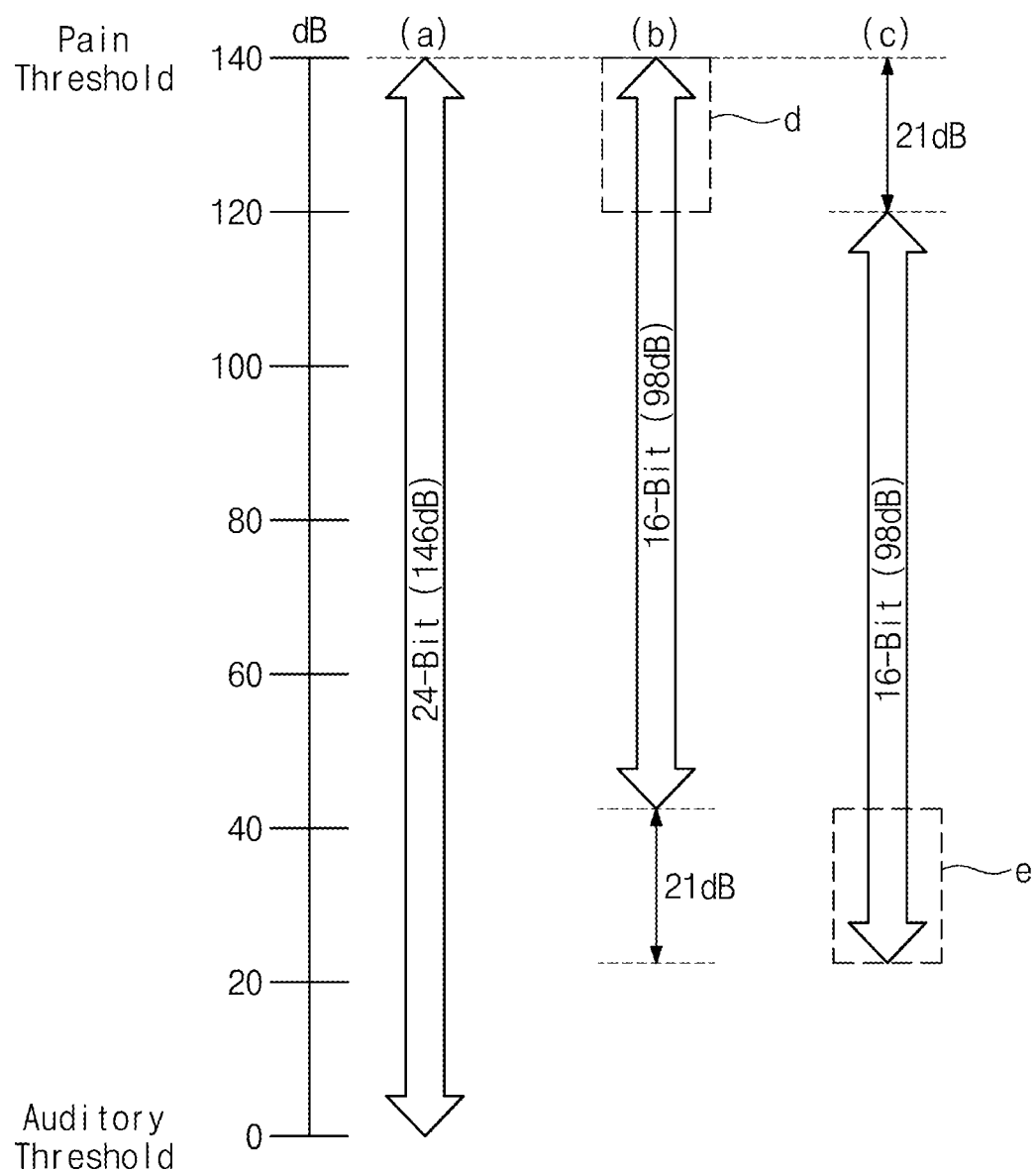
FIG. 2 conceptually illustrates various examples of voice data processed by an electronic device of FIG. 1.

FIG. 2 conceptually illustrates various examples of voice data processed by the electronic device 1000 of FIG. 1.

In the case where the electronic device 1000 is in a normal mode or a high-performance mode (hereinafter referred to as a "normal mode"), the electronic device 1000 may perform the voice recognition on a voice having a dynamic range of 146 dB. For example, 146 dB may correspond to a range from the smallest (e.g., quietest) sound that a human is capable of perceiving to the greatest (e.g., loudest) sound corresponding to a limit of pain that his/her ear feels. For example, a voice having a dynamic range of 146 dB may be converted into 24-bit data by the DMIC interface circuit 1120 and may correspond to a voice zone indicated by (a) of FIG. 2.

In the case where the electronic device 1000 is in a low-power mode or a sleep mode (hereinafter collectively referred to as a "low-power mode"), the electronic device 1000 may perform the voice recognition on a voice having a dynamic range of 98 dB. For example, in the case where the electronic device 1000 is implemented with an electronic device such as a smartphone or a tablet, the low-power mode may include a state (e.g., a standby state) where the user does not use the electronic device 1000. For example, a voice having a dynamic range of 98 dB may correspond to a zone of voice recognition that the main processor 1900 performs in the low-power mode.

In detail, a voice zone indicated by (b) illustrates the case where the user puts his/her lips to the digital microphone 1110 of the electronic device 1000 and utters sounds (or words), and a voice zone indicated by (c) illustrates the case where the user utters sounds (or words) at a distance of 1 m from the digital microphone 1110 of the electronic device 1000. For example, a difference between an upper limit of the voice zone indicated by (b) and an upper limit of the voice zone indicated by (c) may correspond to a zone (about 21 dB) indicated by "d", and a difference between a low limit of the voice zone indicated by (b) and a low limit of the voice zone indicated by (c) may correspond to a zone (about 21 dB) indicated by "e".

In the case where the electronic device 1000 is in the low-power mode, because a dynamic range of a voice zone that the main processor 1900 processes is limited (e.g., to 16 bits), a success rate of voice recognition may vary depending on a distance between an utterance point of the user and the digital microphone 1110. For example, to increase a recognition rate of a voice uttered at a relatively close distance from the electronic device 1000, it is important to set the DMIC interface circuit 1120 such that a voice in the zone indicated by "d" is not lost. In contrast, to increase a recognition rate of a voice uttered at a relatively long distance from the electronic device 1000, it is important to set the DMIC interface circuit 1120 such that a voice in the zone indicated by "e" is not lost.

According to certain embodiments, the DMIC interface circuit 1120 of the present disclosure does not rely on a pre-set maxscale gain and then tune the maxscale gain of the PCM signal while or after a voice is recognized by the main processor 1900. Instead, according to certain embodiments, the DMIC interface circuit 1120 of the present disclosure decides the maxscale gain depending on a distance between the user and the electronic device 1000 acquired in advance, and the DMIC interface circuit 1120 tunes the maxscale gain of the PCM signal before the voice recognition is executed by the main processor 1900. Then, subsequently, when voice recognition begins and is initiated, the maxscale gain is already set and voice recognition begins using that gain and without having to adjust the gain while the voice recognition is occurring. Accordingly, because a gain does not change during voice recognition, it may be possible to make a voice recognition rate high.

Figure 3:
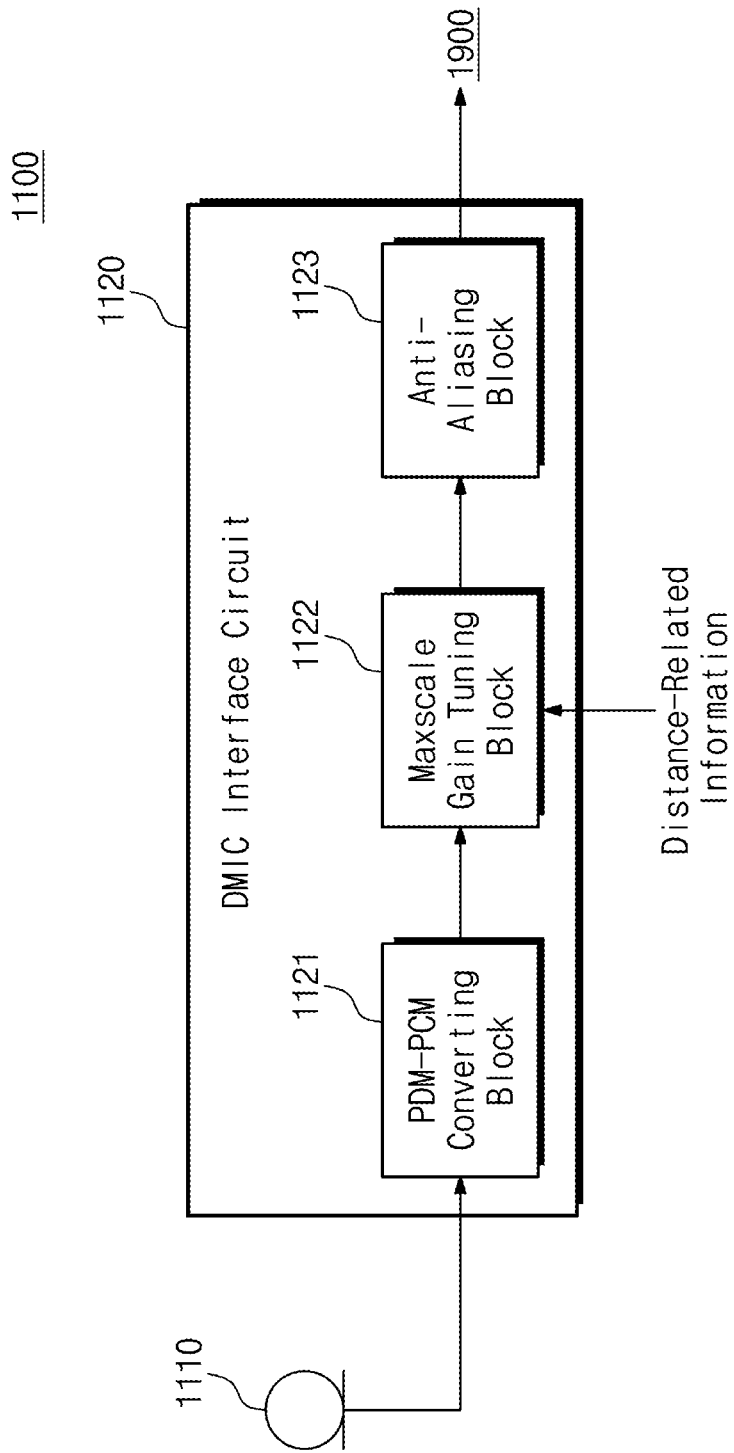
FIG. 3 illustrates an exemplary configuration of an audio processing block of FIG. 1 in detail.

FIG. 3 illustrates an exemplary configuration of the audio processing block 1100 of FIG. 1 in detail. The audio processing block 1100 may include the digital microphone 1110 and the DMC interface circuit 1120.

The digital microphone 1110 may receive a voice signal from the user and may convert the received voice signal into a digital signal. To this end, the digital microphone 1110 may include an analog-to-digital converting block. For example, the analog-to-digital converting block included in the digital microphone 1110 may perform delta-sigma modulation based analog-to-digital conversion to acquire high-resolution voice data.

The analog-to-digital converting block included in the digital microphone 1110 may perform over-sampling on the voice signal input through the digital microphone 1110. In addition, the digital microphone 1110 may perform noise shaping on the voice signal. For example, the analog-to-digital converting block included in the digital microphone 1110 may include a loop filter for reducing a quantization error occurring in the process of converting an analog voice signal into a digital signal.

The digital microphone 1110 may output a 1-bit pulse density modulation (PDM) signal over-sampled through the above over-sampling and noise shaping. The digital microphone 1110 may transmit the converted PDM signal to the DMIC interface circuit 1120.

The DMIC interface circuit 1120 may process the PDM signal received from the digital microphone 1110 so as to be processed by the main processor 1900 in the low-power mode. To this end, the DMIC interface circuit 1120 may include a PDM-PCM converting block 1121, a maxscale gain tuning block 1122, and an anti-aliasing block 1123.

The PDM-PCM converting block 1121 converts the PDM signal received from the digital microphone 1110 into a pulse code modulation (PCM) signal of specific bits (e.g., 19 bits). The anti-aliasing block 1123 may perform filtering for acquiring voice data of a desired frequency band (or a target frequency band). For example, the anti-aliasing block 1123 may perform a role of a low pass filter.

However, the number of bits (e.g., 16 bits) of the PCM signal that is appropriate for the main processor 1900 in the low-power mode to perform a voice recognition operation may be less than the number of bits (e.g., 19 bits) of the PCM signal that is output from the DMIC interface circuit 1120. Accordingly, a zone of the PCM signal that the main processor 1900 uses to perform voice recognition may vary depending on a distance between the user and the electronic device 1000. For example, when a distance between the user and the electronic device 1000 is close, a loss of a most significant bit (MSB) corresponding to the greatest sound from among bits constituting the PCM signal may be of concern. In contrast, when a distance between the user and the electronic device 1000 is long, a loss of a least significant bit (LSB) among the bits constituting the PCM signal may be of concern.

Accordingly, before voice recognition is performed by the main processor 1900, the maxscale gain tuning block 1122 of the present disclosure may tune a gain of the PCM signal output from the PDM-PCM converting block 1121 based on a distance value between the user and the electronic device 1000, which is acquired in advance. For example, when a distance between the user and the electronic device 1000 is close, the maxscale gain tuning block 1122 may decrease the maxscale gain of the PCM signal. In contrast, when a distance between the user and the electronic device 1000 is long, the maxscale gain tuning block 1122 may increase the maxscale gain of the PCM signal. An operation of the maxscale gain tuning block 1122 will be described in detail later.

Function blocks illustrated in FIG. 3 are exemplary, and the inventive concept is not limited thereto. For example, unlike the example where the PDM-PCM converting block 1121 and the anti-aliasing block 1123 are implemented with independent function blocks, the DMIC interface circuit 1120 may include one chip or circuit that performs an operation of converting the PDM signal into the PCM signal and an anti-aliasing operation.

Figure 4:
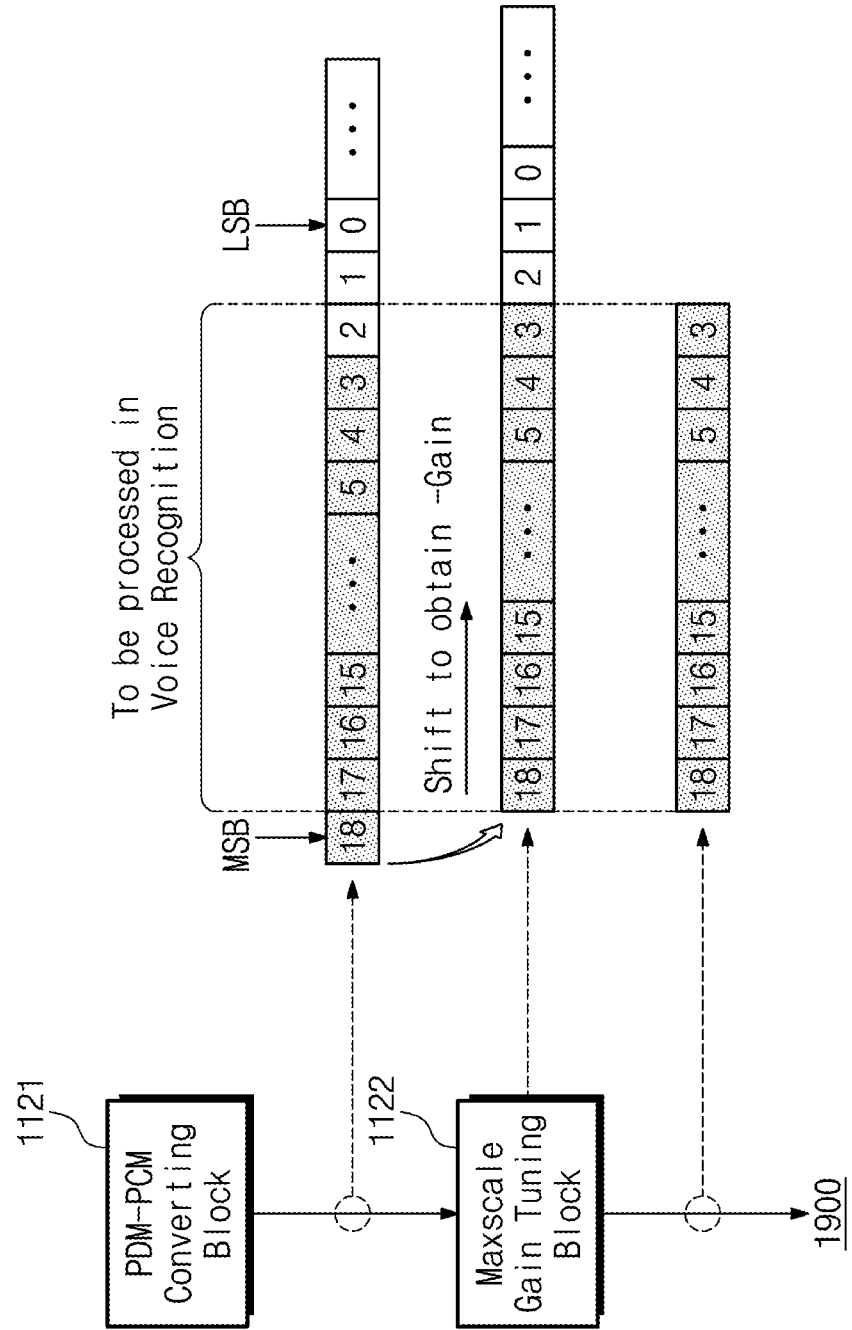
FIGS. 4 and 5 conceptually illustrate an operation of a maxscale gain tuning block of FIG. 3.
Figure 5:
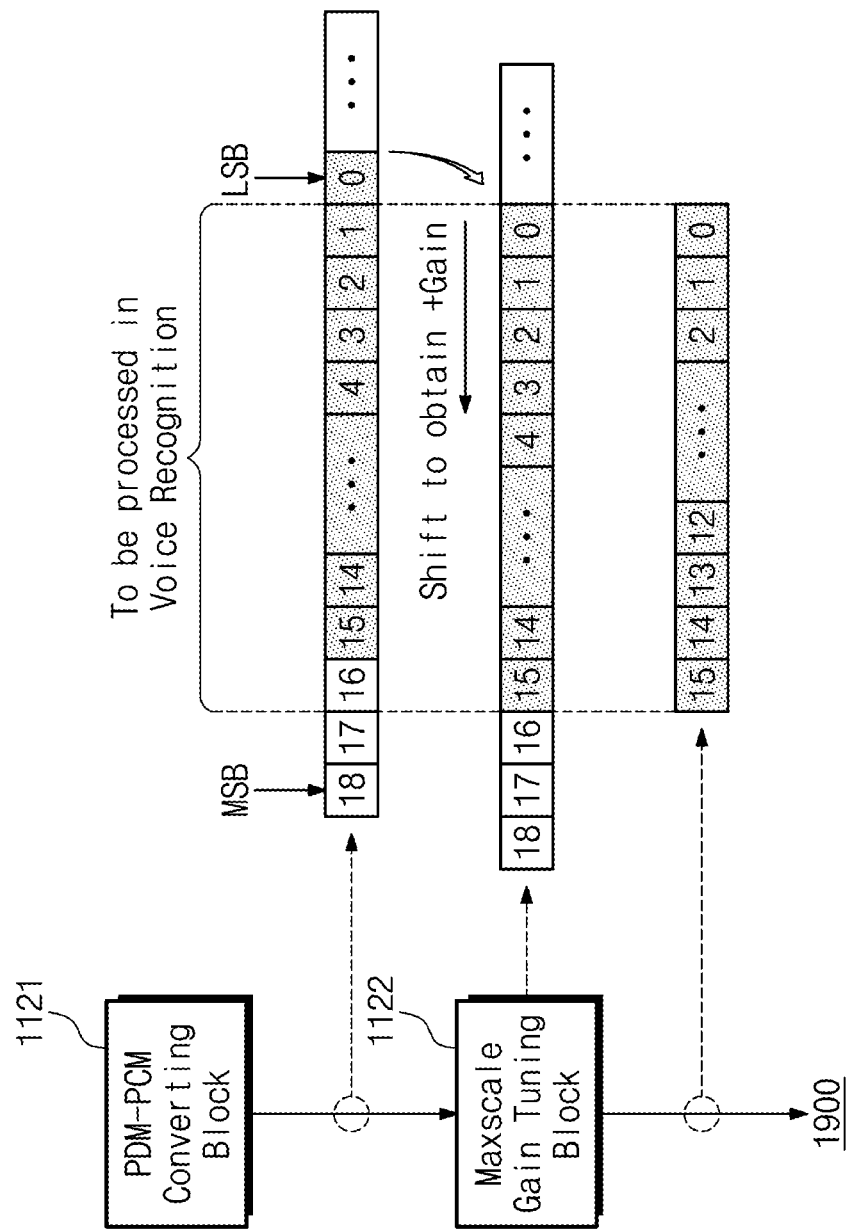

FIGS. 4 and 5 conceptually illustrate an operation of a maxscale gain tuning block of FIG. 3.

In an embodiment, FIG. 4 is associated with processing corresponding to the case where a distance between the user and the electronic device 1000 is relatively close. For example, the PCM signal output from the PDM-PCM converting block 1121 may be a 19-bit signal. The LSB of the PCM signal may correspond to relatively low (e.g., quiet) sound of the signal output from the PDM-PCM converting block 1121, and the MSB of the PCM signal may correspond to relatively high (e.g., loud) sound of the signal output from the PDM-PCM converting block 1121.

However, the number of bits of the PCM signal is not limited thereto. For example, the number of bits of the PCM signal may be less than the number of bits (e.g., 24 bits) of data used when the electronic device 1000 in the normal mode performs voice recognition. The number of bits of the PCM signal may be less than the number of bits (e.g., 16 bits) of data used when the electronic device 1000 in the low-power mode performs voice recognition.

However, because the number of bits of voice data to be processed by the main processor 1900 in the low-power mode is limited to "16", all data output from the PDM-PCM converting block 1121 are not processed by the main processor 1900. For example, when the user puts his/her lips to the digital microphone 1110 (refer to FIG. 1) and utters sounds (or words), data corresponding to a zone of a relatively high sound level may be output from the PDM-PCM converting block 1121, and the MSB may be more important for voice recognition of the user.

As illustrated in FIG. 4, in the case where a distance between the user and the electronic device 1000 is relatively close, the MSB of the PCM signal output from the PDM-PCM converting block 1121 may be out of a zone capable of being processed by the main processor 1900. Therefore, in the case where the MSB is not separately processed, the main processor 1900 may perform voice recognition by using data composed of bits from 2 to 17. In this case, because the MSB corresponding to a high sound level is relatively important in voice recognition, a voice recognition rate may decrease.

The maxscale gain tuning block 1122 of the present disclosure may decrease a gain of the PCM signal output from the PDM-PCM converting block 1121 based on information about a distance between the user and the electronic device 1000, which is acquired in advance before utterance of the user. For example, the maxscale gain tuning block 1122 may perform shifting in units of decibel (e.g., 0.25 dB), not bit. Because a value to be shifted is in advance decided before utterance of the user and the maxscale gain of the PCM signal is tuned, a gain of a voice signal does not change while voice recognition is performed by the main processor 1900. Therefore, a voice recognition rate may be prevented from decreasing.

In an embodiment, FIG. 5 may be associated with processing corresponding to the case where a distance between the user and the electronic device 1000 is relatively long. For example, the PCM signal output from the PDM-PCM converting block 1121 may be a 19-bit signal. The LSB of the PCM signal may correspond to the quietest sound of the signal output from the PDM-PCM converting block 1121, and the MSB of the PCM signal may correspond to the loudest sound of the signal output from the PDM-PCM converting block 1121.

As illustrated in FIG. 5, in the case where a distance between the user and the electronic device 1000 is relatively long, the LSB of the PCM signal output from the PDM-PCM converting block 1121 may be out of a zone capable of being processed by the main processor 1900. Therefore, in the case where the LSB is not separately processed, the main processor 1900 may perform voice recognition by using data composed of bits from 1 to 16. In this case, because the LSB corresponding to a small sound level is relatively important in voice recognition, a voice recognition rate may decrease.

However, the maxscale gain tuning block 1122 of the present disclosure may increase a gain of the PCM signal output from the PDM-PCM converting block 1121 based on information about a distance between the user and the electronic device 1000, which is acquired in advance before utterance of the user. Because a value to be shifted is in advance decided before utterance of the user, a gain of a voice signal does not change while voice recognition is performed by the main processor 1900. Therefore, a voice recognition rate may be prevented from decreasing.

Figure 6:
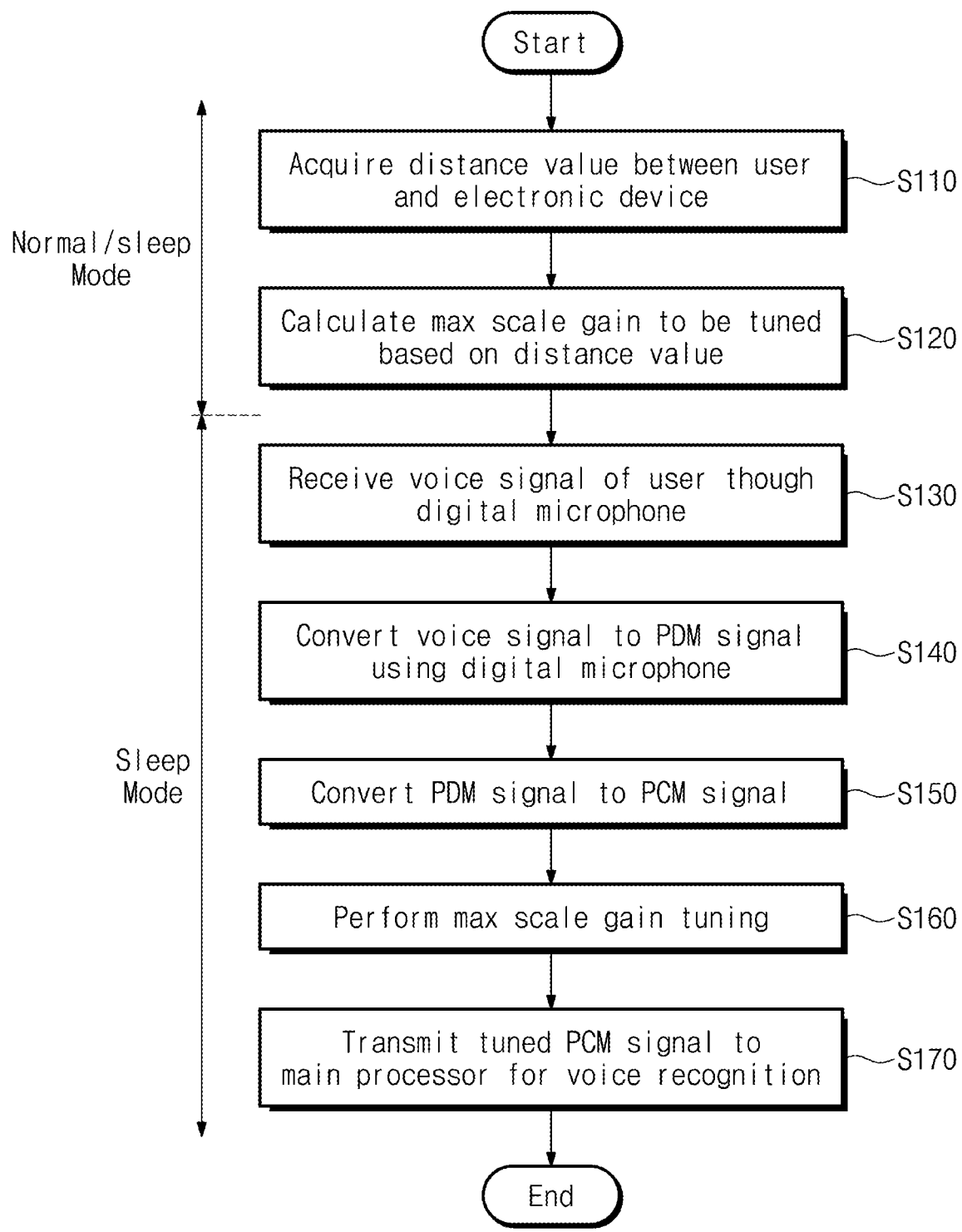
FIG. 6 illustrates an operating method of an electronic device including a voice recognition module according to an embodiment of the present disclosure.

FIG. 6 illustrates an operating method of an electronic device including a voice recognition module according to an embodiment of the present disclosure. An operating method of an electronic device including a voice recognition module will be described with reference to FIGS. 1 and 3.

In operation S110, a distance value between the user and the electronic device 1000 may be acquired. In detail, the acquired distance value may be a distance value between the user and the digital microphone 1110. For example, the distance value may be in advance acquired by the image processing block 1200 implemented with, for example, a ToF camera, and/or the sensor 1700 implemented with, for example, a proximity sensor or an ultrasonic sensor.

In operation S120, a maxscale gain to be tuned may be calculated based on the acquired distance value. For example, the maxscale gain to be tuned may be calculated by the main processor 1900 or an audio dedicated processor (not illustrated) of the audio processing block 1100. As a distance between the user and the electronic device 1000 decreases, it is important to secure the MSB of the PCM signal, which corresponds to a relatively high sound level. Accordingly, a maxscale gain to be tuned by the maxscale gain tuning block 1122 may be smaller than the maxscale gain (e.g., a preset gain) of the PCM signal output from the PDM-PCM converting block 1121. As a distance between the user and the electronic device 1000 increases, it is important to secure the LSB of the PCM signal, which corresponds to a relatively low sound level. Accordingly, a maxscale gain to be tuned by the maxscale gain tuning block 1122 may be greater than the maxscale gain (e.g., a preset gain) of the PCM signal output from the PDM-PCM converting block 1121.

In an embodiment, a relationship between a distance between the user and the electronic device 1000 and a maxscale gain may be managed by using a separate table. For example, when a distance between the user and the electronic device 1000 belongs to a first range, a maxscale gain may be tuned to a first value. For example, when a distance between the user and the electronic device 1000 belongs to a second range, a maxscale gain may be tuned to a second value. As in the above description, when a distance between the user and the electronic device 1000 belongs to an n-th range, a maxscale gain may be tuned to an n-th value. For example, the first range (or distance range) and the second range (or distance range) may not overlap each other or may partially overlap each other. The third range (or distance range) to the n-th range (or distance range) may not overlap each other or may partially overlap each other.

In an embodiment, a table that defines a relationship between a distance between the user and the electronic device 1000 and a maxscale gain may be managed by the buffer memory 1400, may be managed by a separate memory (not illustrated) provided in the audio processing block 1100, or may be managed by a separate memory (not illustrated) in the main processor 1900.

For example, operation S110 and operation S120 described above may be performed while the electronic device 1000 is in the normal mode or is in the low-power mode.

Afterwards, a voice signal from the user may be received through the digital microphone 1110. A 1-bit PDM signal may be generated by performing, at the digital microphone 1110, over-sampling and noise shaping on the received voice signal (S140). The PDM signal is transmitted to the DMIC interface circuit 1120, and the PDM-PCM converting block 1121 of the DMIC interface circuit 1120 converts the PDM signal into the PCM signal (S150).

In operation S160, maxscale gain tuning may be executed. For example, the DMIC interface circuit 1120 may tune a gain of the PCM signal based on the maxscale gain calculated in operation S120. For example, the maxscale gain tuning block 1122 may be configured to acquire an intended gain based on an operation of shifting the PCM signal. A configuration and an operation of the maxscale gain tuning block 1122 will be described in detail later.

Afterwards, the DMIC interface circuit 1120 transmits the tuned PCM signal to the main processor 1900 (S170). Operation S130 to operation S170 described above may be performed while the electronic device 1000 is in the low-power mode. In addition, although not illustrated in FIG. 5, additional processing such as anti-aliasing may be further performed on the tuned PCM signal.

Figure 7:
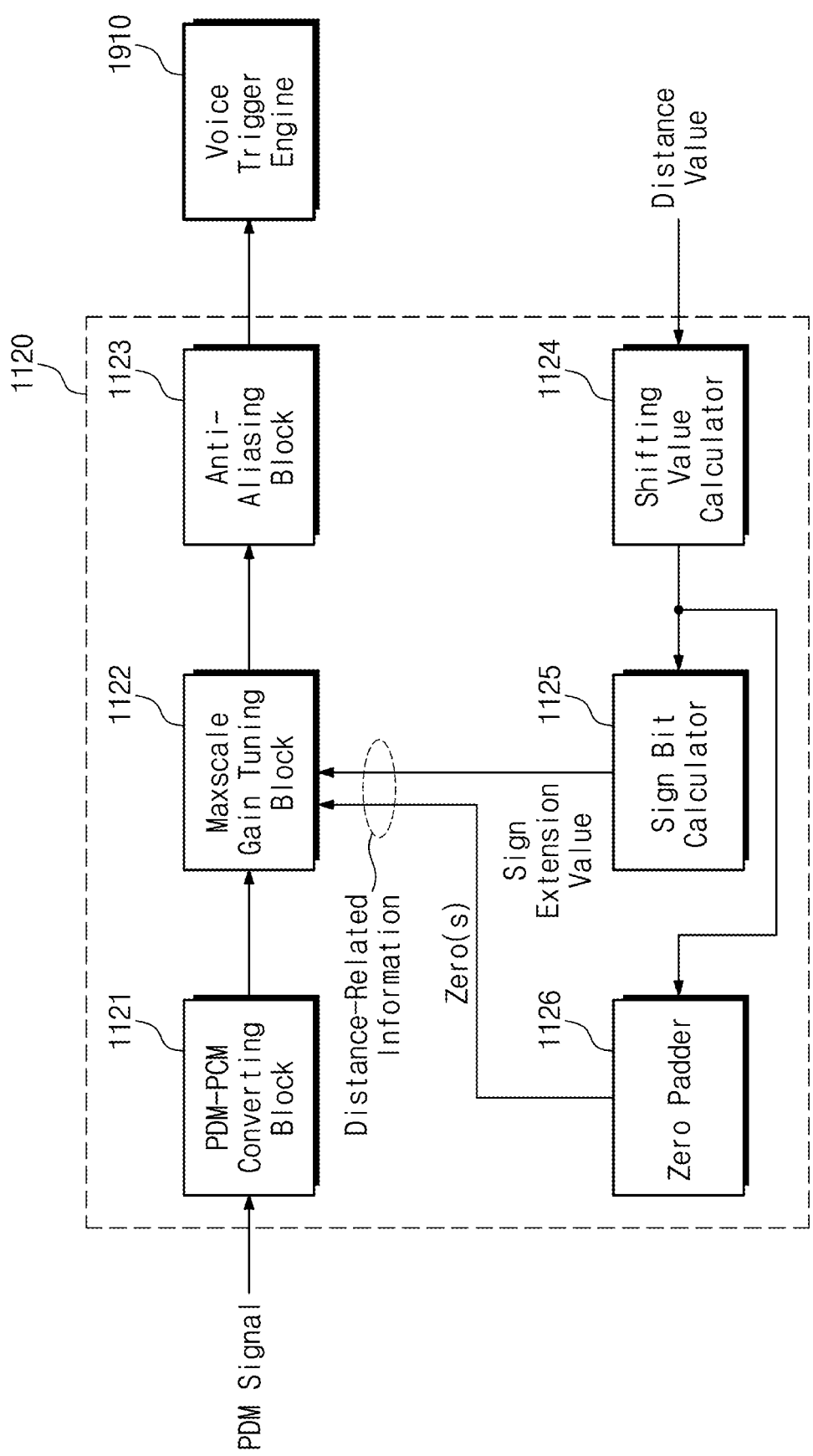
FIG. 7 illustrates an exemplary configuration that generates distance-related information used by a maxscale gain tuning block of FIG. 3.

FIG. 7 illustrates an exemplary configuration that generates distance-related information used by the maxscale gain tuning block 1122 of FIG. 3.

The DMIC interface circuit 1120 may include the PDM-PCM converting block 1121, the maxscale gain tuning block 1122, and the anti-aliasing block 1123. For example, the DMIC interface circuit 1120 may further include a shifting value calculator 1124, a sign bit calculator 1125, and a zero padder 1126, which constitute a circuit (or device) for generating distance-related information used by the maxscale gain tuning block 1122. The PDM-PCM converting block 1121, the maxscale gain tuning block 1122, and the anti-aliasing block 1123 are substantially identical to those of FIG. 3, and thus, additional description will be omitted to avoid redundancy.

The shifting value calculator 1124 may decide a target maxscale gain with reference to a table that defines a relationship between a distance between the user and the electronic device 1000 and a maxscale gain. The shifting value calculator 1124 may calculate a gain value to be increased or decreased (i.e., a bit value to be shifted) based on a result of comparing the target maxscale gain and a maxscale gain of the PCM signal.

However, due to a resolution of the maxscale gain tuning block 1122, a shifting value implemented by the maxscale gain tuning block 1122 and a value to be shifted may not accurately coincide with each other. Accordingly, the maxscale gain tuning block 1122 may shift the PCM signal as much as an approximate value of a value to be actually shifted, based on a result of appropriately combining PCM signals respectively shifted to various values.

To this end, the shifting value calculator 1124 may generate shifting values for variously shifting the PCM signal to various values. For example, a shifting value may be "0" or more than "0" and may be smaller than a length of a signal. In an embodiment, in the case where the PCM signal has a length of 19 bits in the low-power mode, the shifting value may be an integer between "0" and "18". A desired tuning value of the PCM signal may be acquired by combining PCM signals shifted to various values among integers between "0" and "18".

The sign bit calculator 1125 may decide the number of MSB data (i.e., a sign extension value) to be repeated depending on sign extension to be performed on the PCM signal. For example, the sign extension may be associated with a sign of the shifted PCM signal, in combining a plurality of PCM signals shifted to different values. For example, the sign bit calculator 1125 may calculate a value of the sign extension, based on a calculation result of the shifting value calculator 1124. For example, the sign extension may be performed on the MSB data of the PCM signal or may be performed on two upper data bits of the PCM signal. However, for brevity of illustration and for convenience of description, in the specification, it is assumed that a sign bit indicates only the MSB of the PCM signal. The sign extension associated with tuning the maxscale gain of the inventive concept will be described in detail with reference to FIG. 9.

The zero padder 1126 may generate a zero value as much as the number of bits to be shifted in the case of increasing the maxscale gain of the PCM signal. This will be described in detail with reference to FIG. 9. Meanwhile, the sign extension value and the zero value described above may be referred to as "distance-related information".

Afterwards, the maxscale gain tuning block 1122 may tune the maxscale gain of the PCM signal, based on shifting values, sign bits, and a zero value. An operation of the maxscale gain tuning block will be described in detail with reference to FIG. 9. An example is illustrated in FIG. 7 as the shifting value calculator 1124, the sign bit calculator 1125, and the zero padder 1126 are separate function blocks. However, in another embodiment, the shifting value calculator 1124, the sign bit calculator 1125, and the zero padder 1126 may be implemented with one function block (e.g., a dedicated circuit). Alternatively, the shifting value calculator 1124, the sign bit calculator 1125, and the zero padder 1126 may be implemented with a dedicated audio processor for processing a signal associated with the DMIC interface circuit 1120.

Figure 8:
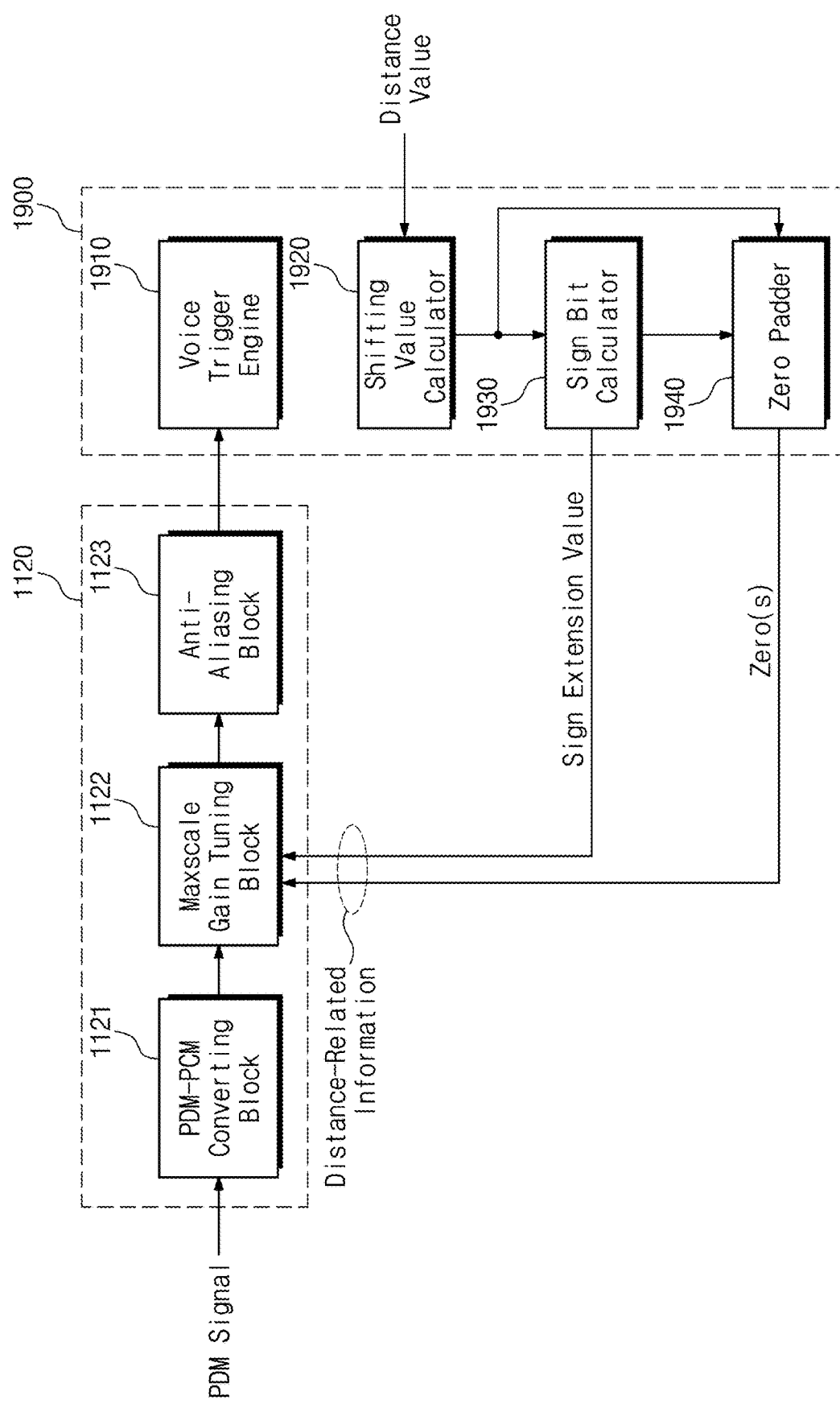
FIG. 8 illustrates an exemplary configuration that generates distance-related information used by a maxscale gain tuning block of FIG. 3.

FIG. 8 illustrates an exemplary configuration that generates distance-related information used by the maxscale gain tuning block 1122 of FIG. 3. Operations of function blocks illustrated in FIG. 8 may be roughly identical or similar to the operations of the function blocks illustrated in FIG. 7. Thus, additional description will be omitted to avoid redundancy.

However, unlike the embodiment of FIG. 7, an operation of calculating a shifting value, an operation of calculating a sign extension value, an operation of calculating zero values may be performed by the main processor 1900. For example, the main processor 1900 may include a shifting value calculator 1920, a sign bit calculator 1930, and a zero padder 1940, in addition to the voice trigger engine 1910 for voice recognition. For example, the shifting value calculator 1920, the sign bit calculator 1930, and the zero padder 1940 may be function blocks (e.g., software or firmware) that are executed by the main processor 1900.

Figure 9:
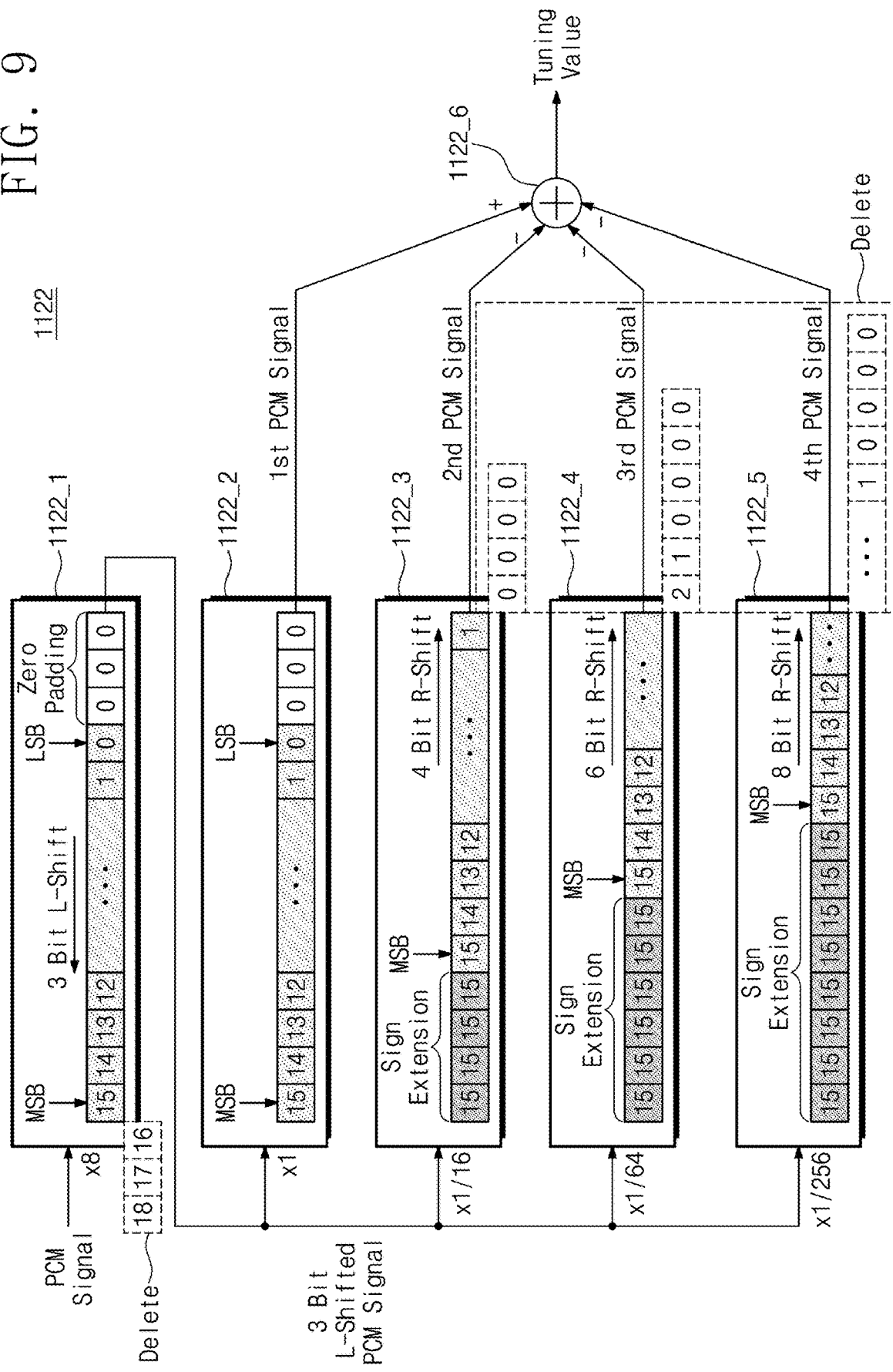
FIG. 9 illustrates an exemplary configuration of a maxscale gain tuning block of FIGS. 7 and 8.

FIG. 9 illustrates an exemplary configuration of the maxscale gain tuning block 1122 of FIGS. 7 and 8.

The maxscale gain tuning block 1122 may include a plurality of shifters 1122_1 to 1122_5 and an adder 1122_6. Although not illustrated in drawing, the maxscale gain tuning block 1122 may further include a component (e.g., an inverter) for inverting a value of the PCM signal having a negative sign bit. However, for brevity of illustration and for convenience of description, a component (e.g., an inverter) for inverting a value of the PCM signal having a negative sign bit is not illustrated separately, and it is assumed that the adder 1122_6 includes a component for performing both of an adding operation and a subtracting operation.

An operation of the maxscale gain tuning block 1122 in the case of increasing a maxscale gain of the PCM signal as much as 2.9 bits will be described with reference to FIGS. 7 and 9. An increase in the maxscale gain of the PCM signal as much as 2.9 bits causes an increase in a gain of the PCM signal as much as $2^{2.9}$ times (i.e., 7.46 times). However, it may be difficult to exactly increase a gain of the PCM signal as much as 7.46 times due to the configuration of the maxscale gain tuning block 1122 (e.g., a limit of the number of shifters). Accordingly, the shifting value calculator 1124 may perform, for example, calculation for drawing a number close to 7.46 in units of 0.25 dB. For example, the shifting value calculator 1124 may perform calculation expressed by Equation 1 below and may draw 7.336 as a number close to 7.46.

$$2^3 \times \left(\frac{1}{2^0} - \frac{1}{2^4} - \frac{1}{2^6} - \frac{1}{2^8}\right) = 7.336 \quad \text{[Equation 1]}$$

Here, Equation 1 above may indicate that a maxscale gain of the PCM signal is increased as much as $2^3$ times (i.e., 8) and is then decreased as much as ($1/2^0 - 1/2^4 - 1/2^6 - 1/2^8$) times (i.e., 0.917). In other words, the maxscale gain tuning block 1122 may increase the maxscale gain of the PCM signal as much as 8 times and may decrease the maxscale gain of the PCM signal, which is increased as much as 8 times, as much as 0.917 times. Of course, the order of the calculations is not limited thereto. Also, $20 \log(\frac{1}{2}^0 - \frac{1}{2}^4 - \frac{1}{2}^6 - \frac{1}{2}^8)$ that is −0.75 dB is associated with that the maxscale gain is performed in units of 0.25 dB.

In Equation 1 above, $\frac{1}{2}^8$ may correspond to an increase in the maxscale gain of the PCM signal as much as 8 times (i.e., left shift by 3 bits). In Equation 1 above, $\frac{1}{2}^0$ may indicate that a shift is not made with regard to the PCM signal left shifted by 3 bits, and $\frac{1}{2}^4$ may indicate that a right shift by 4 bits is made with regard to the PCM signal left shifted by 3 bits. Also, $\frac{1}{2}^6$ may indicate that a right shift by 6 bits is made with regard to the PCM signal left shifted by 3 bits, and $\frac{1}{2}^8$ may indicate that a right shift by 8 bits is made with regard to the PCM signal left shifted by 3 bits. As a result, the shifting value calculator 1124 may provide the maxscale gain tuning block 1122 with information about shifting values (i.e., 3, 0, 4, 6, and 8). Also, the sign bit calculator 1125 may provide the maxscale gain tuning block 1122 with values (i.e., information about a sign of $\frac{1}{2}^0$, a sign of $\frac{1}{2}^4$, a sign of $\frac{1}{2}^6$, and a sign of $\frac{1}{2}^8$) of sign extension based on a calculation result of the shifting value calculator 1124.

In an embodiment, to implement the concept of Equation 1 above, the plurality of shifters 1122_1 to 1122_5 of the maxscale gain tuning block 1122 may be connected as illustrated in FIG. 9. For example, the maxscale gain tuning block 1122 may include a component to increase the maxscale gain of the PCM signal as much as 8 times and a component to decrease the maxscale gain of the PCM signal, which is increased as much as 8 times, as much as 0.917 times. For example, the first shifter 1122_1 may correspond to a component to increase the maxscale gain of the PCM signal as much as 8 times, and the second shifter 1122_2 to the fifth shifter 1122_5 may correspond to a component to decrease the maxscale gain of the PCM signal, which is increased as much as 8 times, as much as 0.917 times. The first shifter 1122_1 may left shift the PCM signal by 3, and the second shifter 1122_2 to the fifth shifter 1122_5 may right shift the PCM signal, which is left shifted by 3 bits, to different values, respectively.

The first shifter 1122_1 may receive a zero value from the zero padder 1940 and may perform zero padding based on the zero value. For example, the first shifter 1122_1 may pad three 0s at LSB data of the PCM signal, based on a zero value of "3". The PCM signal may be left shifted as the zero padding result, and three upper bits (i.e., $18^{th}$ to $16^{th}$ bits) may be deleted. As such, data of a $15^{th}$ bit may be an MSB data. Because it is assumed above that the MSB of the PCM signal is a sign bit, the $15^{th}$ bit may be a sign bit.

Each of the second shifter 1122_2 to the fifth shifter 1122_5 may receive the PCM signal left shifted by 3 bits. Each of the second shifter 1122_2 to the fifth shifter 1122_5 may receive a sign extension value from the sign bit calculator 1125 or a zero value from the zero padder 1126. For example, the second shifter 1122_2 to the fifth shifter 1122_5 may receive sign extension values (e.g., 0, 4, 6, and 8) from the sign bit calculator 1125, respectively. However, the reason that the second shifter 1122_2 to the fifth shifter 1122_5 perform sign extension is that a left shift is not made at the second shifter 1122_2 to the fifth shifter 1122_5. Therefore, in the case where a left shift is made, a shifter (e.g., at least one of the shifters 1122_2 to 1122_5) may receive a zero value(s) corresponding to the left shift.

As understood from Equation 1 above and FIG. 9, sign extension and zero padding are not made at the second shifter 1122_2. Accordingly, the second shifter 1122_2 may output the PCM signal, which is left shifted by 3 bits and is received from the first shifter 1122_1, as a first PCM signal without modification.

The third shifter 1122_3 may extend MSB data of the PCM signal, based on a sign bit value of "4". As the sign extension is repeatedly performed on the MSB data, a right shift may be performed on the PCM signal left shifted by 3 bits. That the sign extension is performed as the $15^{th}$ bit data of the PCM signal are repeated 4 times is conceptually illustrated in FIG. 9. As such, four lower bits including three padded zeros and a 0-th bit being an original LSB may be deleted, and the third shifter 1122_3 may output the PCM signal thus shifted as a second PCM signal.

Operations of the fourth shifter 1122_4 and the fifth shifter 1122_5 may be similar to the above operation of the third shifter 1122_3. As a result, the PCM signal left shifted by 3 bits may again be output as a third PCM signal, and the fifth shifter 1122_5 may output a fourth PCM signal.

The adder 1122_6 may receive the first to fourth PCM signals from the shifters 1122_2 to 1122_5 and may perform an adding operation and/or a subtracting operation on the first to fourth PCM signals. The adder 1122_6 may output a tuning value as a result of adding the shifted PCM signals. The tuning value may be a value obtained by multiplying a value obtained by taking common log for the value in Equation 1 and "20" together and may allow a gain of the PCM signal input to the maxscale gain tuning block 1122 to increase as much as 17.31 dB.

The shifters 1122_1 to 1122_5 illustrated in FIG. 9 are for tuning a maxscale gain in units of 0.25 dB, and the number of shifters is exemplary. Accordingly, in the case of intending to tune a maxscale gain with a more precise resolution (e.g., less than 0.25 dB), the maxscale gain tuning block 1122 may include more shifters in number.

In addition, the connection relationship and operations of the first shifter 1122_1 to the fifth shifter 1122_5 of FIG. 9 are exemplary. For example, the first shifter 1122_1 to the fifth shifter 1122_5 may be connected in various manners depending on a shifting order. For example, in Equation 1 above, it is assumed that the maxscale gain of the PCM signal is first decreased as much as 0.917 times and is then increased as much as 8 times. In this case, the first shifter 1122_1 to the fourth shifter 1122_4 may right shift the PCM signal as much as 0 bit, 4 bits, 6 bits, and 8 bits, respectively. The adder 1122_6 may receive PCM signals output from the first shifter 1122_1 to the fourth shifter 1122_4 and may perform an adding operation and/or a subtracting operation on the received PCM signals. Finally, the fifth shifter 1122_5 may receive the PCM signal output from the adder 1122_6 and may left shift the received PCM signal by 3 bits. In this case, the PCM signal output from the fifth shifter 1122_5 may be used as a tuning value.

Figure 10:
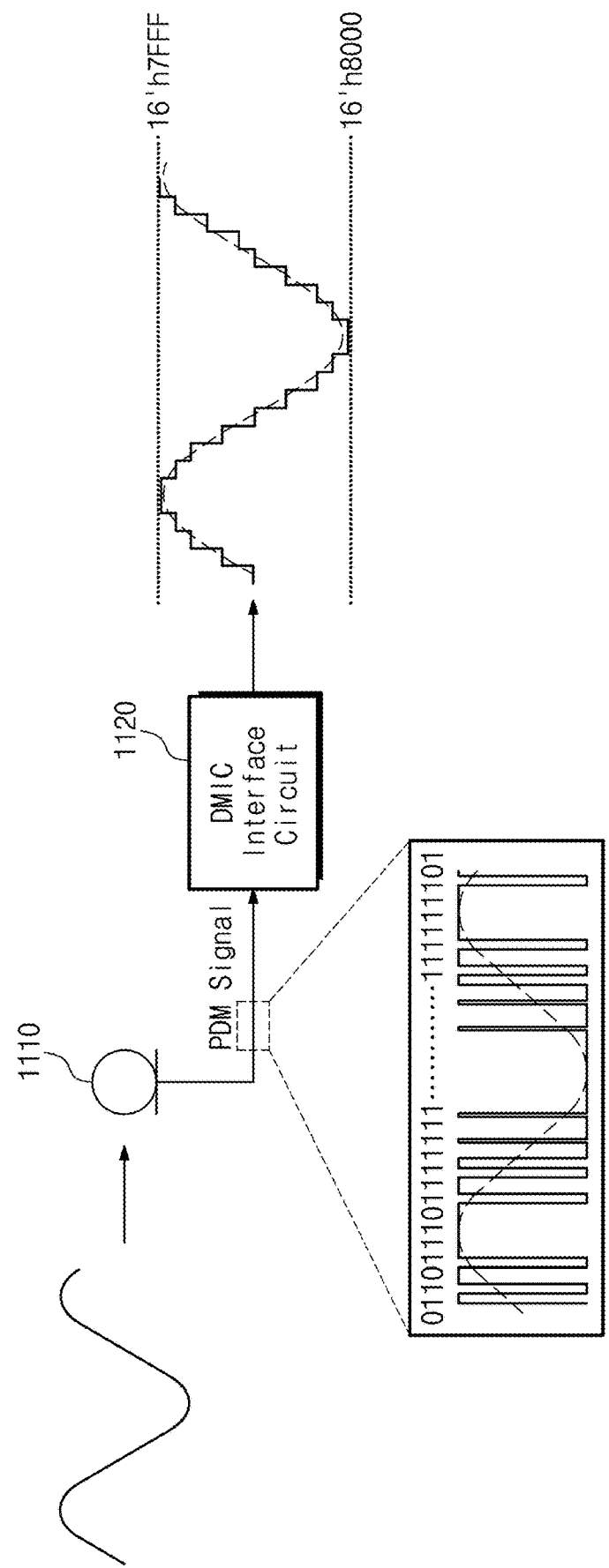
FIG. 10 illustrates an exemplary configuration of a maxscale gain tuning block of FIGS. 7 and 8.
Figure 11:
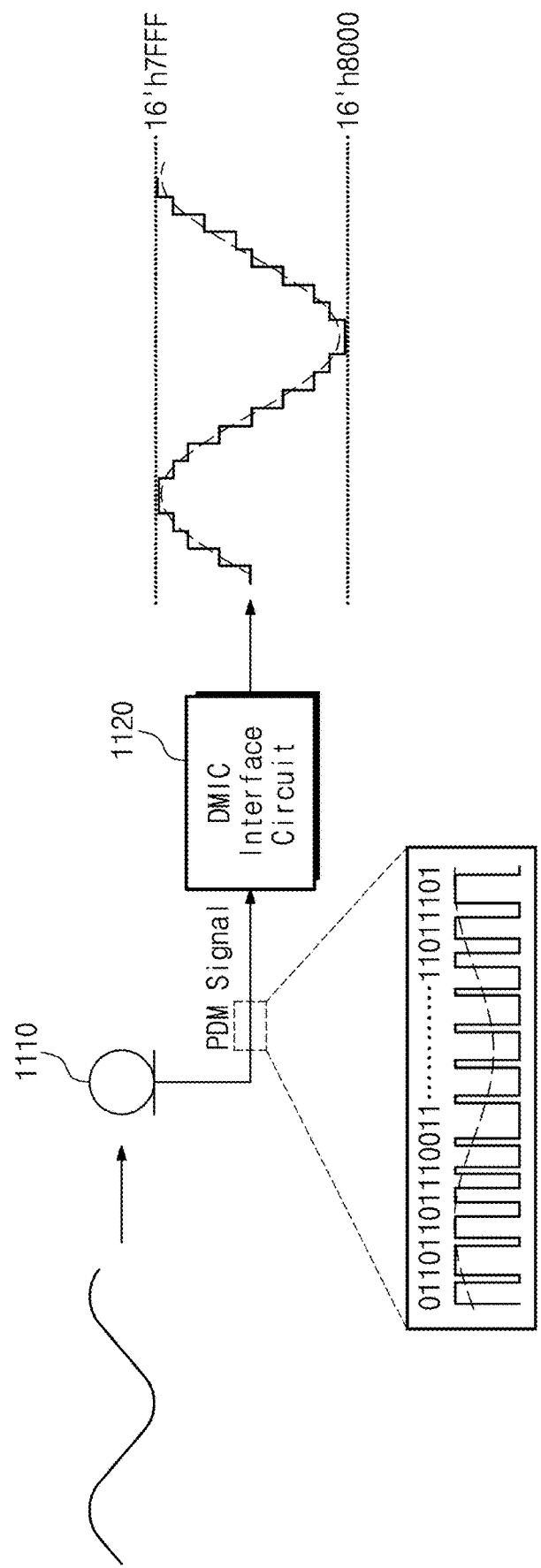
FIG. 11 conceptually illustrates how a dynamic range and a resolution change by tuning a maxscale gain, according to an embodiment of the present disclosure.

FIGS. 10 and 11 conceptually illustrate how a dynamic range and a resolution change by tuning a maxscale gain, according to an embodiment of the present disclosure.

First, referring to FIG. 10, the digital microphone 1110 receives a voice signal having a relatively high sound level and converts the voice signal into a PDM signal. The DMIC interface circuit 1120 may convert the PDM signal into the PCM signal; to make a voice recognition rate high, the DMIC interface circuit 1120 may tune a maxscale gain for securing MSB data based on a distance between the user and the electronic device 1000 acquired in advance.

For example, in the case where the distance between the user and the electronic device 1000 acquired in advance is close, a voice signal of a relatively high sound level may be received, and the DMIC interface circuit 1120 may decrease the maxscale gain of the PCM signal for the purpose of securing the MSB data as illustrated in FIG. 4. As a result, 16-bit data to be used in voice recognition may be adaptively selected.

In contrast, FIG. 11 corresponds to the case where voice recognition is performed on a voice signal having a relatively low sound level. The digital microphone 1110 receives the voice signal having the relatively low sound level and converts the voice signal into the PDM signal. For example, in the case where the distance between the user and the electronic device 1000 acquired in advance is long, a voice signal of a relatively low sound level may be received, and the DMIC interface circuit 1120 may increase the maxscale gain of the PCM signal for the purpose of securing the LSB data as illustrated in FIG. 5.

A dynamic range of the PCM signal that is output from the DMIC interface circuit 1120 and is illustrated in FIG. 10 may be greater than a dynamic range that is output from the DMIC interface circuit 1120 and is illustrated in FIG. 11. A resolution of the PCM signal that is output from the DMIC interface circuit 1120 and is illustrated in FIG. 10 may be smaller than a resolution that is output from the DMIC interface circuit 1120 and is illustrated in FIG. 11. This may be understood as coming from a scale difference of dB in the same range.

Figure 12:
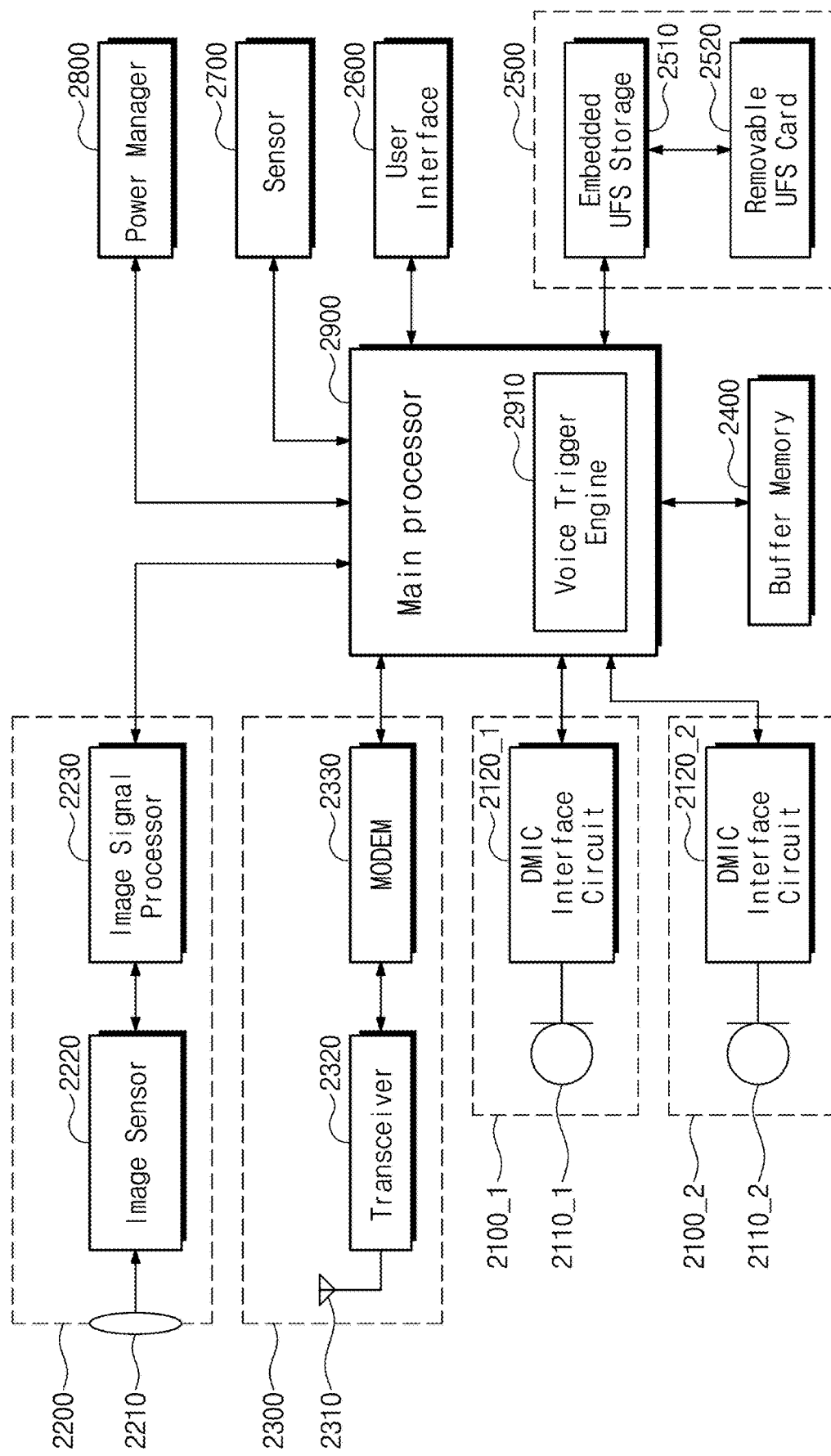
FIG. 12 illustrates an exemplary configuration of an electronic device according to an embodiment of the present disclosure.

FIG. 12 illustrates an exemplary configuration of an electronic device according to an embodiment of the present disclosure.

An electronic device 2000 may include audio processing blocks 2100_1 and 2100_2, an image processing block 2200, a communication block 2300, a buffer memory 2400, a nonvolatile memory 2500, a user interface 2600, a sensor 2700, a power manager 2800, and a main processor 2900. In an embodiment, the audio processing blocks 2100_1 and 2100_2 and a voice trigger engine 2910 may be referred to as a "voice recognition module". Function blocks of the electronic device 2000 of FIG. 12 may be roughly identical to the function blocks of the electronic device 1000 of FIG. 1, which are marked by similar reference numerals, except for the number of audio processing blocks. Thus, additional description associated with the components of the electronic device 2000 will be omitted to avoid redundancy.

However, the first audio processing block 2100_1 may be included in the electronic device 2000, but the second audio processing block 2100_2 may be implemented in various manners. For example, the second audio processing block 2100_2 may be included in the electronic device 2000 like the first audio processing block 2100_1. Alternatively, a part of the second audio processing block 2100_2 may be included in the electronic device 2000. In this case, a second digital microphone 2110_2 of the second audio processing block 2100_2 may be implemented with a wireless microphone (e.g., a Bluetooth microphone).

The first audio processing block 2100_1 may in advance calculate a maxscale gain to be tuned by a maxscale gain tuning block of the first audio processing block 2100_1, based on a distance between the user and the electronic device 2000 acquired in advance. In the case where a voice signal of the user is received after the electronic device 2000 enters the low-power mode, the first audio processing block 2100_1 may tune a maxscale gain of a PCM signal.

However, the second audio processing block 2100_2 may in advance calculate a maxscale gain to be tuned by a maxscale gain tuning block of the second audio processing block 2100_2, based on a distance different from the distance between the user and the electronic device 2000. In the case where a voice signal of the user is received after the electronic device 2000 enters the low-power mode, the second audio processing block 2100_2 may tune or may not tune a maxscale gain of a PCM signal. As a result, the maxscale gain of the PCM signal processed by the first audio processing block 2100_1 and the maxscale gain of the PCM signal processed by the second audio processing block 2100_2 may be different.

After the first and second audio processing blocks 2100_1 and 2100_2 are set such that the PCM signals have different maxscale gains, when a voice signal is received from the user, the first and second audio processing blocks 2100_1 and 2100_2 may perform voice recognition. For example, when voice recognition associated with a signal processed by at least one of the first and second audio processing blocks 2100_1 and 2100_2 or voice recognition associated with signals processed by all the first and second audio processing blocks 2100_1 and 2100_2 is successful, the main processor 1900 may regard the voice recognition as successful. As such, a success rate of voice recognition may be improved by differently setting maxscale gains of PCM signals to be processed by the first and second audio processing blocks 2100_1 and 2100_2.

Because voice recognition is performed in the low-power mode, a power consumption issue may occur. Accordingly, when voice recognition is performed in the low-power mode using all audio processing blocks, the number of bits of a PCM signal to be processed by each of the audio processing blocks may be different from that of the embodiment of FIGS. 1 to 10. For example, the number of bits of a PCM signal to be transmitted from each audio processing block to a main processor may be smaller than 16.

However, unlike the above embodiment of FIGS. 1 to 10, in the embodiment of FIG. 12, because voice recognition is performed in the low-power mode by using the two audio processing blocks 2100_1 and 2100_2, a power consumption issue may occur. Accordingly, when voice recognition is performed in the low-power mode using all the audio processing blocks 2100_1 and 2100_2, the number of bits of a PCM signal to be processed by each of the audio processing blocks 2100_1 and 2100_2 may be different from that of the embodiment of FIGS. 1 to 10. For example, the number of bits of a PCM signal to be transmitted from each of the audio processing blocks 2100_1 and 2100_2 to the main processor 2900 may be smaller than 16.

Figure 13:
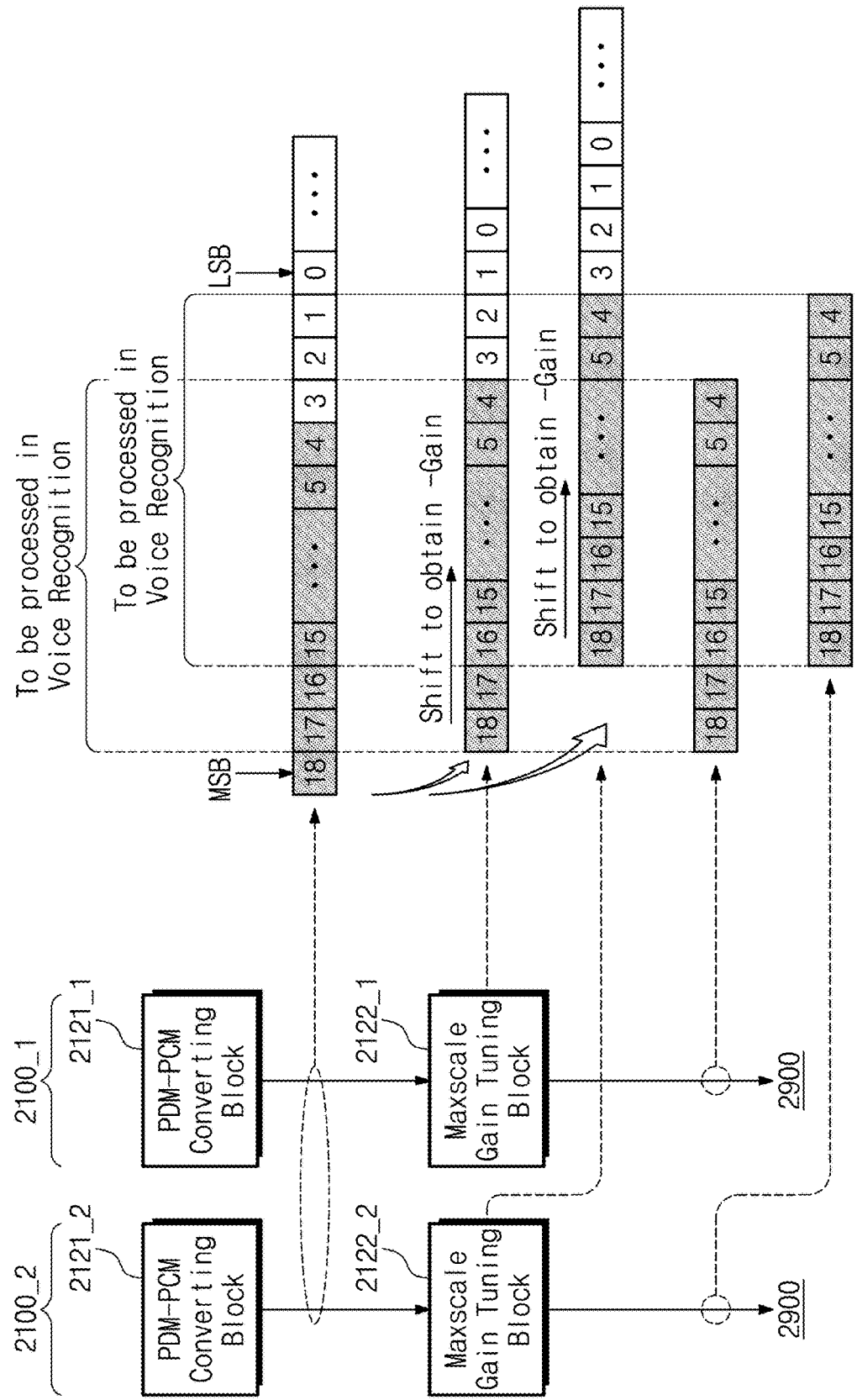
FIG. 13 conceptually illustrates operations of maxscale gain tuning blocks of audio processing blocks of FIG. 12.

FIG. 13 conceptually illustrates operations of maxscale gain tuning blocks of the audio processing blocks 2100_1 and 2100_2 of FIG. 12. For example, the first audio processing block 2100_1 may include a first PDM-PCM converting block 2121_1 and a first maxscale gain tuning block 2122_1, and the second audio processing block 2100_2 may include a second PDM-PCM converting block 2121_2 and a second maxscale gain tuning block 2122_2. However, for brevity of illustration, the anti-aliasing block 1123 illustrated in FIG. 3 is omitted.

PCM signals tuned to have different maxscale gains are illustrated in FIG. 13. For example, a PCM signal processed by the first audio processing block 2100_1 may be based on a distance between the user and the electronic device 2000 acquired in advance, and a PCM signal processed by the second audio processing block 2100_2 may be based on a distance different from the distance between the user and the electronic device 2000. In other words, values shifted by the audio processing blocks 2100_1 and 2100_2 may be different. With regard to the power consumption issue occurring when all the two audio processing blocks 2100_1 and 2100_2 are used, the number of bits of a PCM signal may be less than 16.

Afterwards, the first and second audio processing blocks 2100_1 and 2100_2 may perform anti-aliasing on the tuned PCM signals and may transmit the PCM signals to the main processor 1900. The voice trigger engine 2910 of the main processor 2900 may independently perform a voice recognition operation on the PCM signal output from the first audio processing block 2100_1 and the PCM signal output from the second audio processing block 2100_2; when voice recognition associated with only one PCM signal is succeeds, the voice trigger engine 2910 may regard the voice recognition as successful.

The embodiment of FIG. 13 may be associated with the decrease in the maxscale gain, but the increase of the maxscale gain illustrated in FIG. 5 may be performed in a similar manner. Thus, additional description will be omitted to avoid redundancy. In addition, the number of audio processing blocks is not limited to the example illustrated in FIG. 13. For example, an electronic device may include three or more audio processing blocks, and maxscale gains to be tuned by the three or more audio processing blocks may be different. For example, the number of bits of a PCM signal to be processed by each of three audio processing blocks when voice recognition is performed by using the three audio processing blocks may be less than the number of bits (e.g., 16 bits) of a PCM signal to be processed by one audio processing block when voice recognition is performed by using the one audio processing block.

Figure 14:
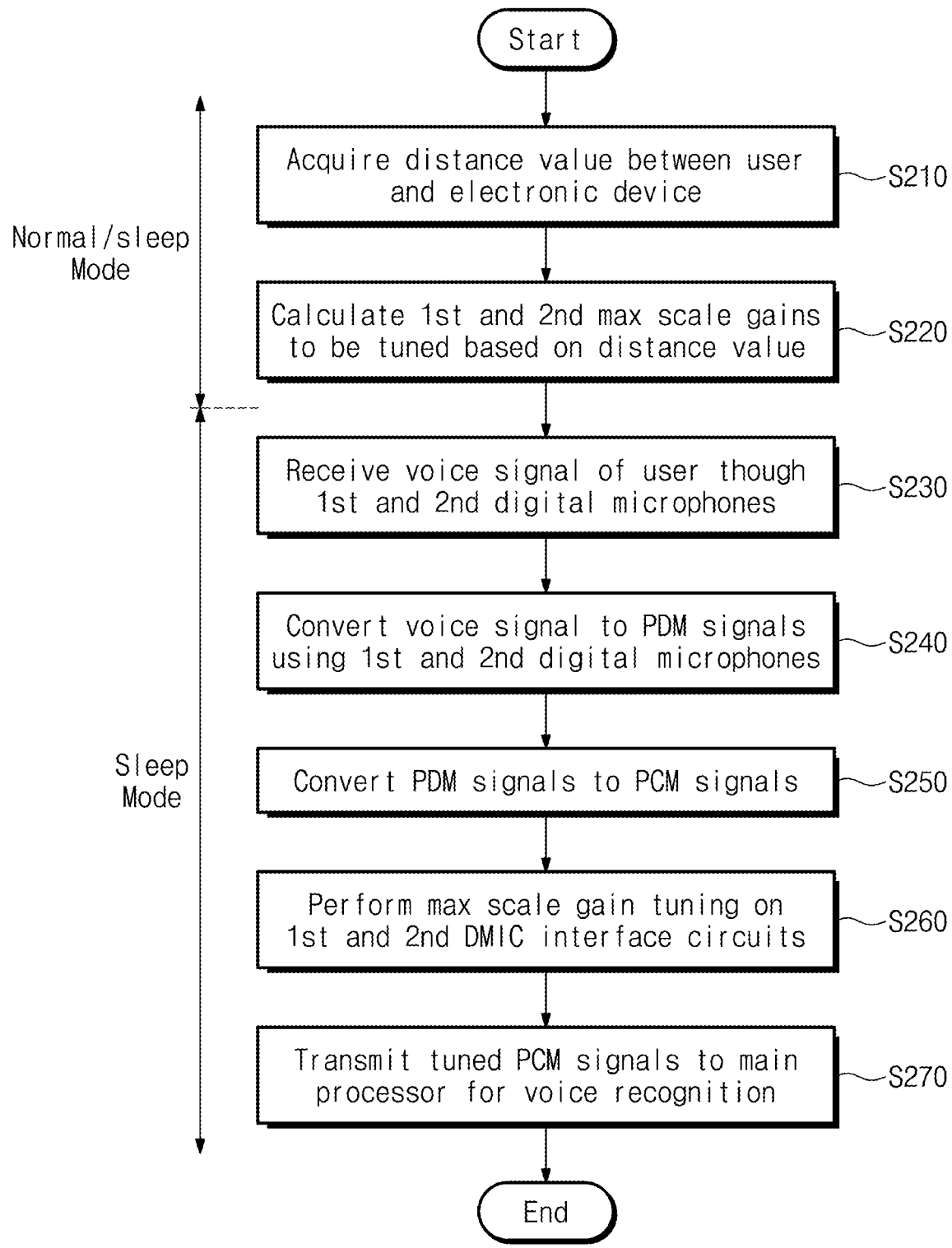
FIG. 14 illustrates an operating method of an electronic device illustrated in FIG. 12.

FIG. 14 illustrates an operating method of an electronic device illustrated in FIG. 12.

A distance value between the user and the electronic device 2000 may be in advance acquired by the image processing block 2200 implemented with, for example, a ToF camera, and/or the sensor 2700 implemented with, for example, a proximity sensor or an ultrasonic sensor (S210). The first and second audio processing blocks 2100_1 and 2100_2 may calculate maxscale gains to be tuned (S220). For example, the first audio processing block 2100_1 may calculate a maxscale gain to be tuned, based on a distance between the user and the electronic device 2000 measured in advance. However, the second audio processing block 2100_2 may calculate a maxscale gain different from that of the first audio processing block 2100_1.

The digital microphones 2110_1 and 2110_2 may receive a voice signal from the user (S230), each of DMIC interface circuits 2120_1 and 2120_2 may convert the voice signal into a PDM signal (S240), and each of the DMIC interface circuits 2120_1 and 2120_2 may convert the corresponding PDM signal into a PCM signal (S250).

In operation S260, each of the first and second audio processing blocks 2100_1 and 2100_2 may execute maxscale gain tuning. However, the first audio processing block 2100_1 may tune the maxscale gain of the PCM signal based on the distance between the user and the electronic device 2000 acquired in advance, while the second audio processing block 2100_2 may tune the maxscale gain of the PCM signal based on a distance different from the distance acquired in advance.

In operation S270, the first and second audio processing blocks 2100_1 and 2100_2 may transmit the PCM signals tuned to have different maxscale gains to the main processor 2900. The voice trigger module 2910 of the main processor 2900 may perform voice recognition based on the PCM signals having different maxscale gains. For example, when the voice recognition based on one PCM signal is successful, the voice trigger module 2910 may regard the voice recognition as successful even though the voice recognition based on the other PCM signal fails.

According to the present disclosure, a voice recognition rate of an electronic device may be improved.

In addition, according to the present disclosure, a distance between a user and the electronic device may be in advance acquired by using various sensors in the electronic device, and a maxscale gain of a PCM signal is tuned based on the acquired distance. The maxscale gain may in this manner be tuned based on sensor data not related to or relying on audible sound. Because a resolution of the PCM signal is maintained by adjusting the maxscale gain of the PCM signal before voice recognition, a voice recognition rate may be improved.

While the inventive concept has been described with reference to exemplary embodiments thereof, it will be apparent to those of ordinary skill in the art that various changes and modifications may be made thereto without departing from the spirit and scope of the invention as set forth in the following claims.

What is claimed is:

1. An electronic device which includes an audio processing block for voice recognition in a low-power mode, comprising:
    a digital microphone configured to receive a voice signal from a user and to convert the received voice signal into a pulse density modulation (PDM) signal; and
    a digital microphone (DMIC) interface circuit, wherein the DMIC interface circuit includes:
    a PDM-PCM converting block configured to convert the PDM signal into a pulse code modulation (PCM) signal;
    a maxscale gain tuning block configured to tune a maxscale gain of the PCM signal received from the PDM-PCM converting block based on a distance information indicating a physical distance between the user and the electronic device acquired in advance of the converting of the PDM signal;
    an anti-aliasing block configured to perform filtering for acquiring voice data of a target frequency band associated with a PCM signal output from the maxscale gain tuning block, and
    a main processor including a voice recognition module configured to perform voice recognition based on a PCM signal output from the anti-aliasing block,
    wherein tuning the maxscale gain includes setting a gain so that a maximum signal amplitude is at a level just below where distortion or failure of voice recognition would occur.

2. The electronic device of claim 1, wherein the maxscale gain tuning block tunes the maxscale gain of the PCM signal received from the PDM-PCM converting block before the voice recognition is initiated by the voice recognition module.

3. The electronic device of claim 1, wherein, when the distance information acquired in advance belongs to a first distance range, the maxscale gain tuning block tunes a maxscale gain of the PCM signal to a first value,
    wherein, when the distance information acquired in advance belongs to a second distance range greater than the first distance range, the maxscale gain tuning block tunes a maxscale gain of the PCM signal to a second value, and
    wherein the second value is greater than the first value.

4. The electronic device of claim 3, wherein the first value is smaller than the maxscale gain of the PCM signal output from the PDM-PCM converting block.

5. The electronic device of claim 3, wherein a PCM signal tuned to the first value includes most significant bit (MSB) data of the PCM signal output from the PDM-PCM converting block, and
wherein a PCM signal tuned to the second value includes least significant bit (LSB) data of the PCM signal output from the PDM-PCM converting block.

6. The electronic device of claim 3, wherein the second value is greater than the maxscale gain of the PCM signal output from the PDM-PCM converting block.

7. The electronic device of claim 1, wherein the maxscale gain tuning block includes:
a plurality of shifters configured to shift the PCM signal received from the PDM-PCM converting block to different shifting values from each other; and
an adder configured to perform an adding operation on PCM signals respectively output from the plurality of shifters.

8. The electronic device of claim 7, wherein the DMIC interface circuit includes:
a shifting value calculator configured to calculate values, to which the PCM signal received from the PDM-PCM converting block is to be shifted, based on the distance information acquired in advance;
a sign bit calculator configured to calculate sign extension values, based on a calculation result of the shifting value calculator; and
a zero padder configured to perform zero padding on the PCM signal received from the PDM-PCM converting block, based on the calculation result of the shifting value calculator.

9. The electronic device of claim 1, wherein the distance information acquired in advance is acquired by at least one of a time of flight (ToF) sensor, an infrared sensor, a proximity sensor, and an ultrasonic sensor.

10. An electronic device which includes an audio processing block for voice recognition in a low-power mode, comprising:
a first digital microphone and a second digital microphone configured to receive a voice signal from a user and convert the received voice signal into a first pulse density modulation (PDM) signal and a second PDM signal, respectively;
a first digital microphone (DMIC) interface circuit configured to receive the first PDM signal, to convert the first PDM signal into a first pulse code modulation (PCM) signal, and to tune a maxscale gain of the first PCM signal based on a distance information between a user and the electronic device acquired in advance of receiving the first PDM signal;
a second DMIC interface circuit configured to receive the second PDM signal, to convert the second PDM signal into a second PCM signal, and to tune a maxscale gain of the second PCM signal based on additional distance information different from the distance information acquired in advance of the first PDM signal,
wherein tuning the maxscale gain includes setting a gain so that a maximum signal amplitude is at a level just below where distortion or failure of voice recognition would occur, and
wherein the first DMIC interface circuit includes:
a first PDM-PCM converting block configured to convert the first PDM signal into the first PCM signal;
a first maxscale gain tuning block configured to tune a maxscale gain of the first PCM signal received from the first PDM-PCM converting block based on the distance information acquired in advance of the first PDM signal;
a first anti-aliasing block configured to perform filtering for acquiring voice data of a target frequency band associated with a first PCM signal output from the first maxscale gain tuning block, and
wherein the second DMIC interface circuit includes:
a second PDM-PCM converting block configured to convert the second PDM signal into the second PCM signal;
a second maxscale gain tuning block configured to tune a maxscale gain of the second PCM signal received from the second PDM-PCM converting block based on the additional distance information; and
a second anti-aliasing block configured to perform filtering for acquiring voice data of a target frequency band associated with a second PCM signal output from the second maxscale gain tuning block; and
a main processor including a voice recognition module configured to perform voice recognition based on the first PCM signal output from the first DMIC interface circuit and the second PCM signal output from the second DMIC interface circuit.

11. The electronic device of claim 10, wherein, when at least one of a first voice recognition processing result based on the first PCM signal output from the first DMIC interface circuit and a second voice recognition processing result based on the second PCM signal output from the second DMIC interface circuit indicates a success, the main processor processes voice recognition as successful.

12. The electronic device of claim 10, further comprising:
at least one of a time of flight (ToF) sensor, an infrared sensor, a proximity sensor, and an ultrasonic sensor for acquiring the distance information in advance.

13. A method for voice recognition of an electronic device which includes a digital microphone (DMIC), a DMIC interface circuit, and a sensor, the method comprising:
acquiring, by the sensor, a distance information between a user and the electronic device indicating a physical distance between the user and the electronic device;
subsequently converting, by the digital microphone, a voice from the user into a pulse density modulation (PDM) signal;
subsequently converting, by the DMIC interface circuit, the PDM signal into a pulse code modulation (PCM) signal;
tuning, by the DMIC interface circuit, a maxscale gain of the converted PCM
signal based on the acquired distance information;
performing, by the DMIC interface circuit, filtering for acquiring voice data of a target frequency band associated with the tuned PCM signal; and
executing, by a voice recognition module, voice recognition based on the filtered PCM signal,
wherein tuning the maxscale gain includes setting a gain so that a maximum signal amplitude is at a level just below where distortion or failure of voice recognition would occur.

14. The method of claim 13, wherein the maxscale gain does not change during the executing of the voice recognition.

15. The method of claim 13, wherein the tuning of the maxscale gain includes:

performing first shifting such that the converted PCM signal has a first shifting value;

performing second shifting such that the converted PCM signal has a second shifting value different from the first shifting value; and generating the tuned PCM signal based on a result of performing the first shifting and a result of performing the second shifting.

16. The method of claim 15, wherein the tuning of the maxscale gain includes:

executing at least one of sign extension and zero padding on at least one of the result of performing the first shifting and the result of performing the second shifting.

17. The method of claim 13, wherein the acquiring of the distance information between the user and the electronic device is performed by using at least one of a time of flight (ToF) sensor, an infrared sensor, a proximity sensor, and an ultrasonic sensor.

* * * * *